(12) United States Patent
McBride et al.

(10) Patent No.: US 10,839,332 B1
(45) Date of Patent: Nov. 17, 2020

(54) IMAGE-CUSTOMIZED LABELS ADAPTED FOR BEARING COMPUTER-BASED, GENERIC, VALUE-BEARING ITEMS, AND SYSTEMS AND METHODS FOR PROVIDING IMAGE-CUSTOMIZED LABELS

(71) Applicant: Stamps.com Inc., El Segundo, CA (US)

(72) Inventors: Kenneth Thomas McBride, Hermosa Beach, CA (US); John Roland Clem, Hermosa Beach, CA (US)

(73) Assignee: Stamps.com, El Segundo, CA (US)

( * ) Notice: Subject to any disclaimer, the term of this patent is extended or adjusted under 35 U.S.C. 154(b) by 598 days.

(21) Appl. No.: 15/362,684

(22) Filed: Nov. 28, 2016

Related U.S. Application Data

(63) Continuation of application No. 11/475,298, filed on Jun. 26, 2006, now abandoned.

(51) Int. Cl.
  *G06Q 10/06* (2012.01)
  *G06Q 30/06* (2012.01)
  *G06K 1/12* (2006.01)

(52) U.S. Cl.
  CPC ....... *G06Q 10/06395* (2013.01); *G06K 1/121* (2013.01); *G06Q 30/0621* (2013.01)

(58) Field of Classification Search
  CPC .............................................. G06Q 10/06395
  See application file for complete search history.

(56) References Cited

U.S. PATENT DOCUMENTS

| | | |
|---|---|---|
| 2,148,155 A | 2/1939 | Grossman |
| 4,201,339 A | 5/1980 | Gunn |
| 4,831,554 A | 5/1989 | Storace et al. |
| 4,831,555 A | 5/1989 | Sansone et al. |
| 4,864,618 A | 9/1989 | Wright et al. |
| 4,872,706 A | 10/1989 | Brewen et al. |
| 5,064,221 A | 11/1991 | Miehe et al. |
| 5,360,628 A | 11/1994 | Butland |
| 5,368,334 A | 11/1994 | Christy et al. |

(Continued)

FOREIGN PATENT DOCUMENTS

| | | |
|---|---|---|
| EP | 0900830 | 3/1999 |
| EP | 1096429 | 5/2001 |

(Continued)

OTHER PUBLICATIONS

Dayton Daily News, "Turn a favorite photo into a postage stamp," D4, Dayton, Ohio, Jun. 22, 2006.*

(Continued)

*Primary Examiner* — Nathan Erb

(74) *Attorney, Agent, or Firm* — Pillsbury Winthrop Shaw Pittman LLP

(57) ABSTRACT

An exemplary embodiment of the present invention will provide a method using a computer, and a computer system, for providing image-customizing labels that are adapted for receiving computer-based, generic, value-bearing item indicia such as, for example, computer-based, generic, postage indicia. The exemplary embodiment of the present invention will comprise generating a display of a user interface screen that is adapted for receiving an order from a user for at least one image-customized label adapted for bearing a computer-based, generic, value-bearing item.

18 Claims, 9 Drawing Sheets

(56) References Cited

U.S. PATENT DOCUMENTS

| | | | |
|---|---|---|---|
| 5,384,886 A | 1/1995 | Rourke | |
| 5,410,642 A | 4/1995 | Hakamatsuka et al. | |
| 5,423,573 A | 6/1995 | de Pasille | |
| 5,425,586 A | 6/1995 | Berson et al. | |
| 5,449,200 A | 9/1995 | Andric | |
| 5,471,925 A | 12/1995 | Heinrich et al. | |
| 5,494,445 A | 2/1996 | Sekiguchi | |
| 5,502,304 A | 3/1996 | Berson et al. | |
| 5,510,992 A | 4/1996 | Kara | |
| 5,524,995 A | 6/1996 | Brookner et al. | |
| 5,554,842 A | 9/1996 | Connell et al. | |
| 5,569,317 A | 10/1996 | Sarada et al. | |
| 5,573,277 A | 11/1996 | Petkovsek | |
| 5,612,889 A | 3/1997 | Pintsov et al. | |
| 5,617,519 A | 4/1997 | Herbert | |
| 5,626,286 A | 5/1997 | Petkovsek | |
| 5,651,238 A | 7/1997 | Belec et al. | |
| 5,666,215 A | 9/1997 | Fredlund et al. | |
| 5,682,318 A | 10/1997 | Kara | |
| 5,717,597 A * | 2/1998 | Kara | G07B 17/00508 700/231 |
| 5,717,980 A | 2/1998 | Oka et al. | |
| 5,737,729 A | 4/1998 | Denman | |
| 5,769,550 A * | 6/1998 | Brand | G07B 17/00508 347/41 |
| 5,794,981 A | 8/1998 | Flynn | |
| 5,801,944 A | 9/1998 | Kara | |
| 5,812,991 A | 9/1998 | Kara | |
| 5,819,240 A * | 10/1998 | Kara | G07B 17/0008 705/408 |
| 5,848,401 A | 12/1998 | Goldberg | |
| 5,873,605 A * | 2/1999 | Kaplan | G09F 3/00 283/71 |
| 5,923,406 A * | 7/1999 | Brasington | G07B 17/00193 355/27 |
| 5,932,139 A | 8/1999 | Oshima et al. | |
| 5,936,865 A | 8/1999 | Pintsov et al. | |
| 5,944,461 A | 8/1999 | Kanbar | |
| 5,995,985 A | 11/1999 | Cai | |
| 6,005,945 A | 12/1999 | Whitehouse | |
| 6,010,156 A | 1/2000 | Block | |
| 6,033,751 A | 3/2000 | Kline | |
| 6,085,126 A | 7/2000 | Mellgren et al. | |
| 6,121,991 A * | 9/2000 | Paz-Pujalt | B41J 35/18 347/176 |
| 6,136,752 A * | 10/2000 | Paz-Pujalt | G09F 3/00 428/195.1 |
| 6,142,380 A | 11/2000 | Sansone et al. | |
| 6,175,826 B1 | 1/2001 | Malandra et al. | |
| 6,181,433 B1 | 1/2001 | Hayama et al. | |
| 6,182,081 B1 | 1/2001 | Dietl et al. | |
| 6,208,980 B1 * | 3/2001 | Kara | G07B 17/00508 101/71 |
| 6,234,694 B1 | 5/2001 | Brookner | |
| 6,209,920 B1 | 6/2001 | Fabel | |
| 6,244,763 B1 | 6/2001 | Miller | |
| 6,249,777 B1 | 6/2001 | Kara | |
| 6,311,240 B1 | 10/2001 | Boone et al. | |
| 6,322,192 B1 | 11/2001 | Walker | |
| 6,370,844 B1 | 4/2002 | Stricker | |
| 6,385,504 B1 | 5/2002 | Pintsov et al. | |
| 6,397,328 B1 | 5/2002 | Pitchenik et al. | |
| 6,408,278 B1 | 6/2002 | Sansone et al. | |
| 6,415,983 B1 | 7/2002 | Ulvr et al. | |
| 6,427,021 B1 | 7/2002 | Fischer et al. | |
| 6,428,219 B1 | 8/2002 | Stier et al. | |
| 6,438,530 B1 | 8/2002 | Heiden et al. | |
| 6,445,822 B1 | 9/2002 | Crill et al. | |
| 6,450,537 B2 * | 9/2002 | Norris | G09F 3/00 229/68.1 |
| 6,461,063 B1 | 10/2002 | Miller | |
| 6,466,921 B1 | 10/2002 | Cordery et al. | |
| 6,503,329 B2 * | 1/2003 | Patton | G09F 3/00 101/371 |
| 6,505,179 B1 | 1/2003 | Kara | |
| 6,505,980 B1 | 1/2003 | Allday | |
| 6,523,014 B1 | 2/2003 | Pauschinger | |
| 6,526,391 B1 | 2/2003 | Cordery et al. | |
| 6,567,794 B1 | 5/2003 | Cordery et al. | |
| 6,594,374 B1 | 7/2003 | Beckstrom et al. | |
| 6,595,412 B2 | 7/2003 | Manduley | |
| 6,650,433 B1 | 11/2003 | Keane et al. | |
| 6,655,579 B1 * | 12/2003 | Delman | G07B 17/00508 235/375 |
| 6,671,407 B1 | 12/2003 | Venkatesan et al. | |
| 6,671,813 B2 | 12/2003 | Anada | |
| 6,672,623 B2 * | 1/2004 | Patton | G09F 3/00 229/68.1 |
| 6,676,164 B1 * | 1/2004 | Patton | B42D 15/027 283/101 |
| 6,692,031 B2 | 2/2004 | McGrew et al. | |
| 6,697,822 B1 | 2/2004 | Armatis et al. | |
| 6,701,304 B2 | 3/2004 | Leon | |
| 6,722,563 B1 | 4/2004 | Johnson et al. | |
| 6,735,575 B1 | 5/2004 | Kara | |
| 6,820,201 B1 | 11/2004 | Lincoln et al. | |
| 6,834,112 B1 | 12/2004 | Brickell | |
| 6,834,273 B1 | 12/2004 | Sansone et al. | |
| 6,839,680 B1 | 1/2005 | Lin et al. | |
| 6,868,406 B1 | 3/2005 | Ogg et al. | |
| 6,902,265 B2 | 6/2005 | Critelli et al. | |
| 6,904,168 B1 | 6/2005 | Steinberg et al. | |
| 6,926,309 B1 * | 8/2005 | Patton | G09F 3/00 118/669 |
| 6,941,286 B1 | 9/2005 | Foth | |
| 6,946,960 B2 | 9/2005 | Sisson et al. | |
| 6,948,660 B2 | 9/2005 | Critelli et al. | |
| 6,972,859 B1 * | 12/2005 | Patton | G06Q 20/045 358/1.14 |
| 6,982,808 B1 | 1/2006 | Ogg | |
| 7,028,902 B2 | 4/2006 | Xu et al. | |
| 7,039,214 B2 | 5/2006 | Miller et al. | |
| 7,043,053 B1 * | 5/2006 | Patton | G09F 3/00 283/71 |
| 7,069,253 B2 | 6/2006 | Leon | |
| 7,085,725 B1 | 8/2006 | Leon | |
| 7,117,363 B2 | 10/2006 | Lincoln et al. | |
| 7,120,687 B1 | 10/2006 | Tessman, Jr. et al. | |
| 7,127,434 B2 * | 10/2006 | Burningham | G07B 17/00193 705/401 |
| 7,149,726 B1 | 12/2006 | Lingle et al. | |
| 7,162,460 B2 | 1/2007 | Cleckler et al. | |
| 7,191,158 B2 | 3/2007 | Ogg et al. | |
| 7,191,336 B2 | 3/2007 | Zeller et al. | |
| 7,194,957 B1 | 3/2007 | Leon et al. | |
| 7,201,305 B1 | 4/2007 | Correa | |
| 7,222,236 B1 | 5/2007 | Pagel | |
| 7,234,645 B2 | 6/2007 | Silverbrook et al. | |
| 7,243,842 B1 * | 7/2007 | Leon | G07B 17/00508 235/375 |
| RE39,779 E | 8/2007 | Kovlakas | |
| 7,266,504 B1 * | 9/2007 | Kara | G07B 17/00508 705/60 |
| 7,266,531 B2 | 9/2007 | Pintsov et al. | |
| 7,305,556 B2 | 12/2007 | Slick et al. | |
| 7,343,357 B1 * | 3/2008 | Kara | G07B 17/0008 705/401 |
| 7,369,048 B2 | 5/2008 | Freund | |
| 7,395,225 B2 * | 7/2008 | Fuwa | G06Q 30/06 705/26.5 |
| 7,418,599 B2 | 8/2008 | Peters | |
| 7,509,291 B2 | 3/2009 | McBride et al. | |
| 7,529,756 B1 | 5/2009 | Haschart et al. | |
| 7,533,067 B2 * | 5/2009 | Beckstrom | G07B 17/00314 355/40 |
| 7,577,618 B2 | 8/2009 | Raju | |
| 7,639,898 B1 | 12/2009 | Chan | |
| 7,828,223 B1 * | 11/2010 | Leon | G07B 17/00508 235/491 |
| 7,831,518 B2 | 11/2010 | Montgomery et al. | |
| 7,844,553 B2 * | 11/2010 | Whitehouse | G06Q 10/0831 705/331 |

(56) References Cited

U.S. PATENT DOCUMENTS

| | | | |
|---|---|---|---|
| 7,873,548 B2* | 1/2011 | Loucks | G06Q 30/06 705/26.1 |
| 7,874,593 B1* | 1/2011 | Clem | G07B 17/00508 283/71 |
| 7,933,845 B1* | 4/2011 | Leon | G07B 17/00024 705/401 |
| 7,941,378 B2 | 5/2011 | Carpenter et al. | |
| 7,949,614 B2* | 5/2011 | Blumberg | B41J 11/009 347/2 |
| 7,954,079 B2 | 6/2011 | Leon et al. | |
| 7,954,709 B1* | 6/2011 | Leon | G07B 17/00508 235/381 |
| 7,970,136 B2* | 6/2011 | Blumberg | B41J 3/4075 355/133 |
| 7,979,358 B1* | 7/2011 | Clem | G06Q 10/101 705/300 |
| 8,065,239 B1* | 11/2011 | McBride | G07B 17/00024 705/401 |
| 8,086,484 B1 | 12/2011 | Gibson | |
| 8,100,324 B1* | 1/2012 | Leon | G06Q 30/04 235/375 |
| 8,135,651 B2* | 3/2012 | Kara | G07B 17/0008 705/408 |
| 8,336,916 B1* | 12/2012 | Clem | G07B 17/00508 283/71 |
| 8,360,313 B1* | 1/2013 | Leon | G07B 17/00508 235/381 |
| 8,505,978 B1 | 8/2013 | Leon | |
| 8,554,601 B1 | 10/2013 | Marsh et al. | |
| 8,589,309 B2* | 11/2013 | Castineiras | G06Q 30/02 705/329 |
| 8,805,745 B1* | 8/2014 | Huebner | G07B 17/00024 705/408 |
| 8,818,915 B1* | 8/2014 | Leon | G07B 17/00024 705/336 |
| 9,799,148 B2* | 10/2017 | Whitehouse | G07B 17/00508 |
| 2001/0013025 A1 | 9/2001 | Ananda | |
| 2001/0032156 A1 | 10/2001 | Candura | |
| 2001/0042052 A1 | 11/2001 | Leon | |
| 2001/0054153 A1 | 12/2001 | Wheeler et al. | |
| 2002/0017782 A1* | 2/2002 | Patton | G09F 3/00 283/71 |
| 2002/0017783 A1* | 2/2002 | Patton | G09F 3/00 283/71 |
| 2002/0023057 A1 | 2/2002 | Goodwin et al. | |
| 2002/0033598 A1* | 3/2002 | Beasley | G09F 3/00 283/71 |
| 2002/0040333 A1* | 4/2002 | Fuwa | G06Q 30/06 705/27.2 |
| 2002/0046195 A1 | 4/2002 | Martin et al. | |
| 2002/0073039 A1 | 6/2002 | Ogg et al. | |
| 2002/0083020 A1 | 6/2002 | Leon | |
| 2002/0083021 A1 | 6/2002 | Ryan, Jr. et al. | |
| 2002/0089172 A1* | 7/2002 | Patton | G09F 3/00 283/71 |
| 2002/0093568 A1* | 7/2002 | Chumbley | G03B 17/53 348/207.99 |
| 2002/0149195 A1* | 10/2002 | Beasley | G09F 3/00 283/71 |
| 2002/0149495 A1 | 10/2002 | Schach et al. | |
| 2002/0190117 A1 | 12/2002 | Manduley | |
| 2002/0194983 A1 | 12/2002 | Tanner | |
| 2003/0002709 A1 | 1/2003 | Wu | |
| 2003/0004901 A1* | 1/2003 | Dutta | G06Q 30/02 705/402 |
| 2003/0030270 A1 | 2/2003 | Franko | |
| 2003/0037008 A1* | 2/2003 | Raju | G07B 17/0008 705/60 |
| 2003/0059635 A1 | 3/2003 | Naasani | |
| 2003/0078893 A1 | 4/2003 | Shah et al. | |
| 2003/0088426 A1 | 5/2003 | Benson et al. | |
| 2003/0093556 A1 | 5/2003 | Yeung | |
| 2003/0101143 A1 | 5/2003 | Montgomery et al. | |
| 2003/0101147 A1 | 5/2003 | Montgomery et al. | |
| 2003/0101148 A1 | 5/2003 | Montgomery et al. | |
| 2003/0129570 A1 | 7/2003 | Alabaster | |
| 2003/0130954 A1 | 7/2003 | Carr et al. | |
| 2003/0136826 A1* | 7/2003 | Turner | G06K 19/08 235/101 |
| 2003/0140017 A1* | 7/2003 | Patton | H04N 1/00209 705/410 |
| 2003/0144972 A1 | 7/2003 | Cordery et al. | |
| 2003/0177021 A1 | 9/2003 | Dutta | |
| 2003/0182245 A1 | 9/2003 | Seo | |
| 2004/0000787 A1 | 1/2004 | Vig et al. | |
| 2004/0045203 A1* | 3/2004 | Patton | G09F 3/00 40/638 |
| 2004/0070194 A1 | 4/2004 | Janetzke et al. | |
| 2004/0082098 A1 | 4/2004 | Schmid | |
| 2004/0153517 A1 | 5/2004 | Gang et al. | |
| 2004/0123944 A1 | 7/2004 | Dorrell | |
| 2004/0125413 A1 | 7/2004 | Cordery | |
| 2004/0174012 A1 | 9/2004 | Ogg et al. | |
| 2004/0186811 A1 | 9/2004 | Gullo et al. | |
| 2004/0200902 A1 | 10/2004 | Ishioroshi | |
| 2004/0215523 A1 | 10/2004 | Wulff et al. | |
| 2004/0220935 A1 | 11/2004 | McGraw et al. | |
| 2004/0223798 A1* | 11/2004 | Ogg | G07B 17/00508 400/61 |
| 2004/0236938 A1 | 11/2004 | Callaghan | |
| 2004/0241424 A1 | 12/2004 | Barbera-Guillem | |
| 2004/0254898 A1* | 12/2004 | Parker | G07B 17/00508 705/402 |
| 2005/0065897 A1 | 3/2005 | Ryan, Jr. et al. | |
| 2005/0071296 A1 | 3/2005 | Lepkofker | |
| 2005/0071297 A1* | 3/2005 | Kara | G07B 17/00508 705/410 |
| 2005/0080751 A1* | 4/2005 | Burningham | G07B 17/00193 705/401 |
| 2005/0082818 A1 | 4/2005 | Mertens | |
| 2005/0087605 A1 | 4/2005 | Auslander et al. | |
| 2005/0102151 A1* | 5/2005 | Fuwa | G06Q 30/06 705/26.5 |
| 2005/0114276 A1* | 5/2005 | Hunter | G07B 17/00508 705/408 |
| 2005/0120042 A1 | 6/2005 | Shuster et al. | |
| 2005/0125367 A1 | 6/2005 | Ogg et al. | |
| 2005/0144145 A1 | 6/2005 | Ogg et al. | |
| 2005/0195214 A1 | 9/2005 | Reid et al. | |
| 2005/0251399 A1 | 10/2005 | Agarwal et al. | |
| 2005/0246535 A1 | 11/2005 | Adams et al. | |
| 2005/0256811 A1 | 11/2005 | Pagel et al. | |
| 2006/0015469 A1* | 1/2006 | Whitehouse | G06Q 10/0831 705/410 |
| 2006/0119671 A1 | 6/2006 | Beckstrom et al. | |
| 2006/0136347 A1 | 6/2006 | Reichelsheimer et al. | |
| 2006/0173796 A1 | 8/2006 | Kara | |
| 2006/0224403 A1* | 10/2006 | Whitehouse | G07B 17/00508 705/408 |
| 2006/0230000 A1 | 10/2006 | Lubinger | |
| 2006/0248348 A1 | 11/2006 | Wakao et al. | |
| 2006/0271500 A1 | 11/2006 | Obrea | |
| 2006/0287096 A1 | 12/2006 | O'Kelley et al. | |
| 2006/0293907 A1* | 12/2006 | Castineiras | G06Q 30/02 705/1.1 |
| 2006/0293910 A1* | 12/2006 | Castineiras | G06Q 30/02 705/26.1 |
| 2007/0005518 A1* | 1/2007 | Beckstrom | G07B 17/00314 705/402 |
| 2007/0011995 A1 | 1/2007 | Weaver et al. | |
| 2007/0017985 A1 | 1/2007 | Lapstun et al. | |
| 2007/0108302 A1 | 5/2007 | Pintsov et al. | |
| 2007/0124261 A1* | 5/2007 | Obrea | G07B 17/00508 705/408 |
| 2007/0150422 A1* | 6/2007 | Loucks | G06Q 30/06 705/408 |
| 2007/0198441 A1 | 8/2007 | Kara | |
| 2007/0253550 A1* | 11/2007 | Blumberg | B41J 3/4075 380/51 |
| 2007/0255664 A1* | 11/2007 | Blumberg | G07B 17/00508 705/408 |

(56) References Cited

U.S. PATENT DOCUMENTS

| | | | |
|---|---|---|---|
| 2008/0071636 A1 | 3/2008 | Chatte | |
| 2009/0125561 A1 | 5/2009 | Garcia | |
| 2009/0177545 A1* | 7/2009 | Castineiras | G06Q 30/02 |
| | | | 705/14.36 |
| 2011/0145090 A1* | 6/2011 | Loucks | G06Q 30/06 |
| | | | 705/26.5 |

FOREIGN PATENT DOCUMENTS

| | | |
|---|---|---|
| EP | 1525994 | 4/2005 |
| JP | 2005132049 | 5/1993 |
| JP | 2005215905 | 8/2005 |
| KR | 10-2004-0062496 | 7/2004 |
| WO | WO199519016 | 7/1995 |
| WO | WO97/04353 | 2/1997 |
| WO | WO2005042645 | 5/2005 |
| WO | WO2005060590 | 7/2005 |

OTHER PUBLICATIONS

"Zazzle Custom Stamps for Business; Zazzle.com Pitney Bowes," http://www.zazzle.com/stamps/design.asp?, Pitney Bowes; printed on Nov. 16, 2006; 2 pages.

"Information-Based Indicia Program (IBIP) Performance Criteria for Information-Based Indicia and Security Architecture for Closed IBI Postage Metering Systems (PCIBI-C)", United States Postal Service, Published Jan. 12, 1999, Entire Document, pp. 1-49.

"Invisible Writing: Science Activity," Available from <http://www.eduplace.com/acl/invis.html>. Houghton Mifflin Company, 1997, 1 page.

"New Version of Leading A2iA CheckReader Recognition Software Now Integrates Document Identification, Image Usability Testing and Handwritten Address Capture." Business Wire, Monday, Apr. 26, 2004, 3 pages.

"Picture It Postage by endicia," http://www.pictureitpostage.com/PhotoEditor/EditImage.cfm, Endicia; printed on Nov. 17, 2006; 1 page.

"Pornography: Prevent IlBeing e-mailed Into and Out of Your Company." Business Wire, Wednesday, Sep. 20, 2000, 4 pages.

"US Postal Service: Rio Grande and Aviator Billy Mitchell take flight on new international rate stamps." M2 Presswire, Jun. 19, 1999, pp. 1-4.

"What's selling: from bricks and mortar to bricks and clicks", Playthings Magazine, Feb. 1, 2003, 3 pages.

Canadian Post; Set of pictures and address labels; sample, undated, prior to Jul. 27, 2004, 1 page.

Notice of Allowance for U.S. Appl. No. 10/994,698, dated Dec. 2, 2010, pp. 1-16, USPTO.

Office Action for U.S. Appl. No. 13/038,029, dated Jan. 6, 2012, pp. 1-9, USPTO.

Office Action for U.S. Appl. No. 10/994,728, dated Apr. 18, 2011, pp. 1-8, USPTO.

Office Action for U.S. Appl. No. 10/994,728, dated Jul. 21, 2011, pp. 1-33, USPTO.

Administrative Judge Anton W. Fetting, Appeal Decision for U.S. Appl. No. 10/991,241, dated Apr. 20, 2010, pp. 1-9, USPTO.

Australian Post sample; Jul. 7-16, 2000; Anaheim, CA, 1 page.

Avery Dennison Corporation; "Avery Creative Postage Labels", http://www.creativepostagelabels.avery.com/ postage_aap.html; © 1996-2004, printed on Jul. 30, 2004, 4 pages.

Avery Dennison Corporation; "Avery Creative Postage Labels", http://www.creativepostagelabels.avery.com/order.php; © 1996-2004, printed on Jul. 30, 2004, 2 pages.

Office Action for U.S. Appl. No. 12/316,542, dated Mar. 30, 2011, pp. 1-37, USPTO.

Brown, Bruce, "Internet Postage Services," PC Magazine, dated Jun. 6, 2000, p. 133, Ziff-Davis Publishing Company, 3 pages.

Canada Post Corporation; "Collecting Picture Postage", http://www.canadapost.ca/personal/collecting/default-e.asp? stamp=postage, © 2003, printed on May 19, 2008, 3 pages.

Canada Post International, LLC; "Personal Postage", http://www.personalpostage.com/Canada%20Post.htm, Undated, printed Jul. 20, 2004, 2 pages.

Canadian Post; picture stamp sample, undated, prior to Jul. 27, 2004, 1 page.

Office Action for U.S. Appl. No. 12/316,542, dated Sep. 29, 2011, pp. 1-42, USPTO.

Office Action for U.S. Appl. No. 10/994,728, dated Jan. 25, 2012, pp. 1-22, USPTO.

Office Action for U.S. Appl. No. 10/991,241, dated Jan. 31, 2006, pp. 1-13, USPTO.

Office Action for U.S. Appl. No. 10/991,241, dated Jul. 19, 2005, pp. 1-16, USPTO.

Office Action for U.S. Appl. No. 11/644,458, dated Nov. 4, 2010, pp. 1-22, USPTO.

Interview Summary for U.S. Appl. No. 11/644,458, dated Sep. 2, 2010. pp. 1-7, USPTO.

Office Action for U.S. Appl. No. 11/644,458, dated May 7, 2010, pp. 1-99, USPTO.

Office Action for U.S. Appl. No. 12/943,519, dated Mar. 5, 2012, pp. 1-15, USPTO.

Office Action for U.S. Appl. No. 11/435,453, dated Apr. 21, 2010, pp. 1-13, USPTO.

Notice of Allowance for U.S. Appl. No. 11/435,453, dated Aug. 5, 2010, pp. 1-18, USPTO.

Office Action for U.S. Appl. No. 10/994,914, dated Jul. 21, 2010, pp. 1-38, USPTO.

Office Action for U.S. Appl. No. 10/114,964, dated Jun. 30, 2010, pp. 1-27, USPTO.

Notice of Allowance for U.S. Appl. No. 10/114,964, dated Feb. 3, 2011, pp. 1-8, USPTO.

Notice of Allowance for U.S. Appl. No. 10/994,914, dated Jul. 15, 2011, pp. 1-9, USPTO.

Office Action for U.S. Appl. No. 10/994,914, dated Apr. 26, 2011, pp. 1-9, USPTO.

Office Action for U.S. Appl. No. 13/103,886, dated Feb. 15, 2012, pp. 1-14, USPTO.

Notice of Abandonment for U.S. Appl. No. 10/991,241, dated Jun. 30, 2010, pp. 1-2, USPTO.

Office Action for U.S. Appl. No. 10/991,241, dated Feb. 19, 2009, pp. 1-14, USPTO.

Office Action for U.S. Appl. No. 10/991,241, dated Jul. 7, 2008, pp. 1-13, USPTO.

Office Action for U.S. Appl. No. 10/991,241, dated Jul. 12, 2007, pp. 1-16, USPTO.

Office Action for U.S. Appl. No. 10/991,241, dated Oct. 31, 2006, pp. 1-14, USPTO.

Office Action for U.S. Appl. No. 10/991,241, dated Dec. 31, 2007, pp. 1-15, USPTO.

Notice of Allowance for U.S. Appl. No. 11/729,148, dated Jan. 31, 2011, pp. 1-7, USPTO.

Notice of Allowance for U.S. Appl. No. 12/316,240, dated Sep. 15, 2011, pp. 1-7, USPTO.

Office Action for U.S. Appl. No. 11/729,148, dated May 13, 2010, pp. 1-15, USPTO.

Office Action for U.S. Appl. No. 12/316,240, dated May 25, 2011, pp. 1-8, USPTO.

Office Action for U.S. Appl. No. 13/081,356, dated May 31, 2012, pp. 1-10, USPTO.

Office Action for U.S. Appl. No. 10/994,698, dated May 11, 2010, pp. 1-22, USPTO.

Notice of Allowance for U.S. Appl. No. 13/038,029, dated Apr. 10, 2014, pp. 1-19, USPTO.

Office Action for U.S. Appl. No. 10/994,698, dated Mar. 4, 2009, pp. 1-16, USPTO.

Office Action for U.S. Appl. No. 10/994,698, dated Aug. 3, 2009, pp. 1-14, USPTO.

Office Action for U.S. Appl. No. 10/994,698, dated Aug. 19, 2008, pp. 1-19, USPTO.

(56) References Cited

OTHER PUBLICATIONS

Office Action for U.S. Appl. No. 13/038,029, dated Jul. 30, 2012, pp. 1-11, USPTO.
Office Action for U.S. Appl. No. 11/509,309, dated Jan. 30, 2009, pp. 1-15, USPTO.
Office Action for U.S. Appl. No. 11/509,309, dated Apr. 15, 2008, pp. 1-13, USPTO.
Office Action for U.S. Appl. No. 11/509,309, dated Sep. 30, 2008, pp. 1-16, USPTO.
Office Action for U.S. Appl. No. 11/509,309, dated Oct. 16, 2007, pp. 1-21, USPTO.
Office Action for U.S. Appl. No. 11/509,309, dated May 29, 2007, pp. 1-14, USPTO.
Office Action for 10/994,728, dated Jan. 26, 2009, pp. 1-16, USPTO.
Office Action for U.S. Appl. No. 10/994,728, dated Mar. 16, 2010, pp. 1-14, USPTO.
Office Action for U.S. Appl. No. 10/994,728, dated May 29, 2008, pp. 1-18, USPTO.
Office Action for U.S. Appl. No. 10/994,728, dated Aug. 19, 2009, pp. 1-14, USPTO.
Office Action for U.S. Appl. No. 12/316,542, dated Apr. 23, 2014, pp. 1-45, USPTO.
Notice of Allowance for U.S. Appl. No. 10/994,728, dated Mar. 27, 2014, pp. 1-17, USPTO.
Office Action for U.S. Appl. No. 11/644,458, dated Dec. 4, 2009, pp. 1-17, USPTO.
Notice of Allowance for U.S. Appl. No. 11/644,458, dated Apr. 1, 2013, pp. 1-11, USPTO.
Office Action for U.S. Appl. No. 11/644,458, dated Sep. 13, 2012, pp. 1-27, USPTO.
Office Action for U.S. Appl. No. 13/932,755, dated Jul. 1, 2014, pp. 1-23, USPTO.
Office Action for U.S. Appl. No. 11/644,458, dated Apr. 16, 2009, pp. 1-16, USPTO.
Office Action for U.S. Appl. No. 13/275,704, dated Apr. 15, 2014, pp. 1-31, USPTO.
Office Action for U.S. Appl. No. 13/275,704, dated Dec. 16, 2014, pp. 1-30, USPTO.
Office Action for U.S. Appl. No. 12/316,542, dated Dec. 16, 2014, pp. 1-58, USPTO.
Office Action for U.S. Appl. No. 13/103,886, dated Jan. 15, 2014, pp. 1-25, USPTO.
Office Action for U.S. Appl. No. 13/103,886, dated Sep. 30, 2014, pp. 1-24, USPTO.
Notice of Allowance for U.S. Appl. No. 11/635,871, dated Jul. 15, 2008, pp. 1-10, USPTO.
Notice of Allowance for U.S. Appl. No. 11/635,871, dated Nov. 17, 2008, pp. 1-12, USPTO.
Office Action for U.S. Appl. No. 11/635,871, dated Jun. 19, 2007, pp. 1-5, USPTO.
Office Action for U.S. Appl. No. 11/635,871, dated Dec. 12, 2007, pp. 1-6, USPTO.
Notice of Allowance for U.S. Appl. No. 10/197,044, dated Nov. 24, 2008, pp. 1-10, USPTO.
Office Action for U.S. Appl. No. 12/943,519, dated Aug. 24, 2012, pp. 1-9, USPTO.
Office Action for U.S. Appl. No. 11/435,453, dated Aug. 11, 2009, pp. 1-10, USPTO.
Office Action for U.S. Appl. No. 10/114,964, dated Jun. 23, 2009, pp. 1-14, USPTO.
Office Action for U.S. Appl. No. 10/114,964, dated Dec. 23, 2009, pp. 1-21, USPTO.
Office Action for U.S. Appl. No. 10/994,914, dated Mar. 15, 2010, pp. 1-31, USPTO.
Office Action for U.S. Appl. No. 10/994,914, dated Apr. 17, 2008, pp. 1-22, USPTO.
Office Action for U.S. Appl. No. 10/994,914, dated Aug. 26, 2009, pp. 1-35, USPTO.
Office Action for U.S. Appl. No. 10/994,914, dated Dec. 10, 2008, pp. 1-28, USPTO.
Office Action for U.S. Appl. No. 11/114,964, dated Nov. 26, 2008, pp. 1-15, USPTO.
Office Action for U.S. Appl. No. 13/103,886, dated Jul. 17, 2012, pp. 1-19, USPTO.
Office Action for U.S. Appl. No. 13/275,704, dated Aug. 29, 2012, pp. 1-21, USPTO.
Notice of Allowance for U.S. Appl. No. 11/729,148, dated Sep. 1, 2010, pp. 1-74, USPTO.
Notice of Allowance for U.S. Appl. No. 11/729,239, dated Jun. 24, 2010, pp. 1-21, USPTO.
Notice of Allowance for U.S. Appl. No. 10/994,768, now Pat. No. 7,243,842, dated Jan. 5, 2007, pp. 1-8, USPTO.
Notice of Allowance for U.S. Appl. No. 13/081,356, dated Sep. 5, 2012, pp. 1-7, USPTO.
Office Action for U.S. Appl. No. 11/729,239, dated Dec. 9, 2009, pp. 1-7, USPTO.
J P Leon, "Systems and Methods for Creating and Providing Shape-Customized, Computer-Based, Value-Bearing Items", U.S. Appl. No. 13/932,755, filed Jul. 1, 2013 (including Preliminary Amendment pp. 1-9).
Leon, et ai.,"Computer-Based Value Item Customization Security"; U.S. Appl. No. 13/081,356; Preliminary Amendment (10 pages); filed Apr. 6, 2011.
J.P. Leon, et al., "Image-Customization of Computer-Based Value-Bearing Items"; U.S. Appl. No. 13/038,029, filed Mar. 1, 2011 (including Specification pp. 1-90, Drawing pp. 91-122 and Preliminary Amendment pp. 123-131).
Jay Bigalke, "Small business personalized stamps", publication date unknown; undated; article shows stamp label bearing a date of Jan. 14, 2006, 1 page.
John Roland Clem et al.; "Quality Assurance of Image-Customization of Computer-Based Value-Bearing Items", U.S. Appl. No. 11/114,964, filed Apr. 25, 2005, pp. 1-116 (including specification, claims, abstract and drawings).
John Roland Clem et al.; "Rolls of Image-Customized Value-Bearing Items and Systems and Methods for Providing Rolls of Image-Customized Value-Bearing Items", U.S. Appl. No. 11/435,453, filed May 16, 2006, pp. 1-68, (including specification, claims, abstract and drawings).
John Roland Clem, "Rolls of Image-Customized Value-Bearing Items and Systems and Methods for Providing Rolls of Image-Customized Value-Bearing Items," U.S. Appl. No. 12/943,519, filed Nov. 10, 2010, pp. 1-70 (including preliminary amendment pp. 1-8, specification pp. 9-54, claims pp. 55-59, abstract p. 60 and drawings pp. 61-70).
John Roland Clem, et al., "Quality Assurance of Image-Customization of Computer-Based Value-Bearing Items", U.S. Appl. No. 13/103,886, filed May 9, 2011 (including Preliminary Amendment pp. 1-12, Specification pp. 13-96 and Drawing pp. 97-128).
John Roland Clem; "Automatic Guarantee Delivery Tracking and Reporting for United States Postal Service Postage Refunds for Paid Computer-Based Postage"; U.S. Appl. No. 12/500,970, filed Jul. 10, 2009; pp. 1-67 (including specification, claims, abstract and drawings).
JP Leon et al.; "Computer-Based Value-Bearing Item Customization Security"; U.S. Appl. No. 11/729,148, filed Mar. 27, 2007; pp. 1-24 (including summary of invention pp. 1-6, claims pp. 7-14, abstract p. 15, and preliminary amendment pp. 16-24).
JP Leon et al.; "Computer-Based Value-Bearing Item Customization Security"; U.S. Appl. No. 11/729,239, filed Mar. 28, 2007; pp. 1-23 (including summary of invention pp. 1-6, claims pp. 7-14, abstract p. 15, and preliminary amendment pp. 16-23).
JP Leon et al.; "Image-Customization of Computer-Based Value-Bearing Items"; U.S. Appl. No. 10/994,698, filed Nov. 22, 2004; pp. 1-125 (including specification, claims, abstract and drawings).
JP Leon; "Invisible Fluorescent Ink Mark"; U.S. Appl. No. 11/509,309, filed Aug. 24, 2006; pp. 1-14 (including specification, claims, abstract and drawings).
JP Leon; "Systems and Methods for Creating and Providing Shape-Customized, Computer-Based, Value-Bearing Items"; U.S. Appl.

(56) References Cited

OTHER PUBLICATIONS

No. 11/644,458, filed Dec. 20, 2006; pp. 1-74 (including specification, claims, abstract and drawings).
Kenneth Thomas McBride et al.; "Customized Computer-Based Value-Bearing Item Quality Assurance"; U.S. Appl. No. 10/994,914, filed Nov. 22, 2004; pp. 1-125 (including specification, claims, abstract and drawings).
Kenneth Thomas McBride, et al., "Customized Computer-Based Value-Bearing Item Quality Assurance", U.S. Appl. No. 13/275,704, filed Oct. 18, 2011 (including Preliminary Amendment pp. 1-12, Specification pp. 13-105 and Drawing pp. 106-137).
Kyle Huebner et al.; "Printing of Computer-Based Value-Bearing Items"; U.S. Appl. No. 10/994,728, filed Nov. 22, 2004; pp. 1-118 (including specification, claims, abstract and drawings).
Menezes, A.J., et al.; "Handbook of Applied Cryptography", CRC Press LLC, 1997 (Excerpt-cover pages and pp. 512-515).
Orrick, Dave, "Ruling Means Checking 250,000 'Potential' Pron Images—for One Case," Daily Herald, Arlington Heights, Illinois, Sep. 27, 2002, p. 1.
Personal Postage Corporation; "Personal Postage", http://www.personalpostage.com, undated, printed on Jul. 20, 2004, 1 page.
Personal Postage Corporation; "Personal Postage", http://www.personalpostage.com/home.htm, undated, printed on Jul. 20, 2004, 2 pages.
Personal Postage Corporation; "Quick Reference Guide"; http://www.personalpostage.com/Om_page1.htm, page2.htm, page3.htm, page4.htm, Undated, printed Jul. 20, 2004, 9 pages.
Pitney Bowes, "Create personal postage—Custom postage Stamp Expresssions Printer, How the Stamp Expressions Printer Works", http://www.stampexpm.sioos.comlhow_it_works.cfm: undated, printed Nov. 11, 2009, 2 pages.
Porter, William; "Personal Postage Canadians take to vanity stamps in very big way", Denver Post, Jul. 9, 2000, 2 pages.
Stallings, William, "Network Security Essentials: Applicants and Standards" ISBN 0-13-016093-8. Prentice Hall, 2000. Entire Network cited; front matter, Chapter 7, and index included, pp. 1-23.
Steiner, Rupert; "It's in the mail: a personalised postcode for life", an article about Royal Mail picture stamps, date unknown (prior to Jul. 27, 2004), publication unknown, 1 page.

\* cited by examiner

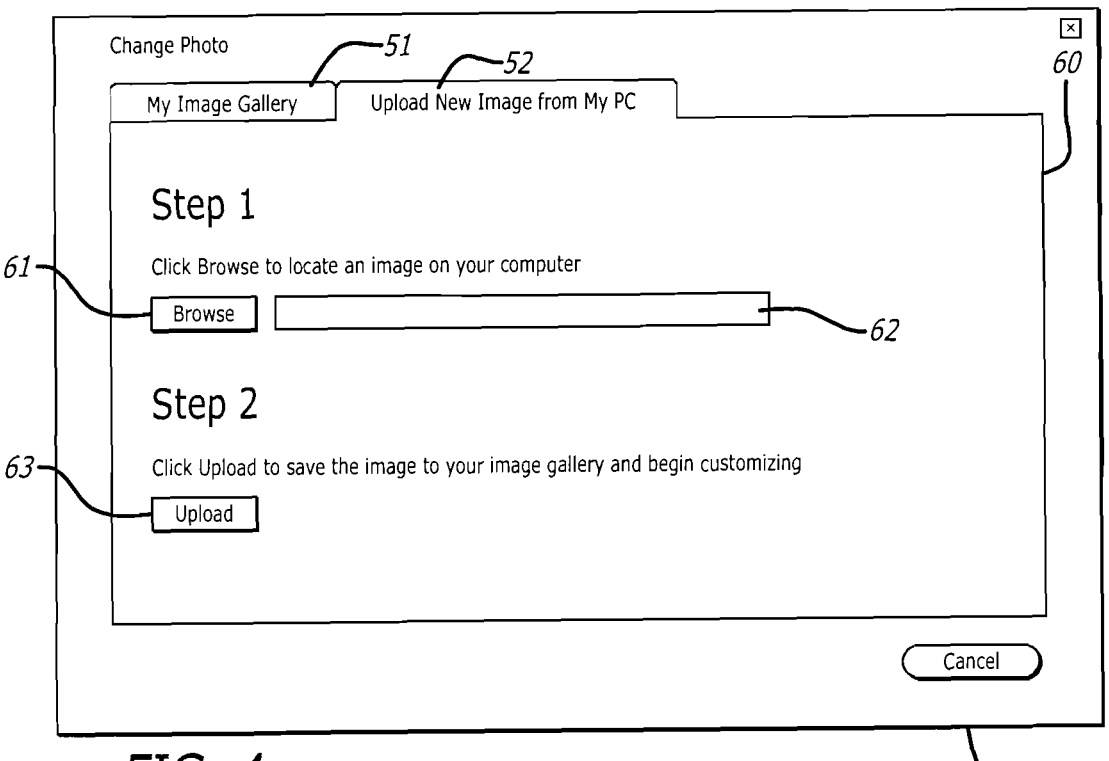

IMAGE-CUSTOMIZED LABELS ADAPTED FOR BEARING COMPUTER-BASED, GENERIC, VALUE-BEARING ITEMS, AND SYSTEMS AND METHODS FOR PROVIDING IMAGE-CUSTOMIZED LABELS

CROSS-REFERENCE TO RELATED APPLICATION

This application is a continuation of U.S. patent application Ser. No. 11/475,298, filed on Jun. 26, 2006 and entitled "IMAGE-CUSTOMIZED LABELS ADAPTED FOR BEARING COMPUTER-BASED, GENERIC, VALUE-BEARING ITEMS, AND SYSTEMS AND METHODS FOR PROVIDING IMAGE-CUSTOMIZED LABELS," the content of which is incorporated herein in its entirety by reference.

FIELD OF THE INVENTION

The field of the present invention is computer-based, generic, value-bearing items, and particularly, image-customized labels adapted for bearing computer-based, generic, value-bearing items such as, for example, computer-based, generic, postage-indicia-bearing items.

BACKGROUND OF THE INVENTION

Remote user-printing of computer-based, generic, value-bearing items has been publicly available for some time. For example, NCR® provides sheets of labels adapted for receiving computer-based, generic postage-indicia, such as NETSTAMPS™ Labels SDC-1000 and SDC-1595. Further, Starnps.com Inc. provides software and services under the name of NETSTAMPS™ that facilitate users printing at printers peripheral to the user's computer, computer-based, generic postage indicia on sheets of labels adapted for receiving such computer-based, generic postage indicia. U.S. patent application Ser. No. 09/975,532 entitled "SYSTEM AND METHOD FOR PROVIDING COMPUTER-BASED POSTAGE STAMPS" (which may sometimes be referred to hereinafter as the "Generic VBI Invention"), the contents and disclosures of which are hereby incorporated by reference in full herein for all purposes as if fully stated here, discloses systems and methods for the creation of generic VBI postage, such that no intended recipient address need be specified, verified or indicated in any way on the created postage. The systems and methods disclosed in the Generic VBI Invention provide for the generation and printing of generic VBI, such as generic postage, that may be used at any time for any recipient, much like pre-printed postage printed and sold by the USPS; the printing is facilitated at printers peripheral to a user's computer.

It will be understood by someone with ordinary skill in the art that value-bearing items ("VBI") include, among other things, postage, coupons, tickets, gift certificates, currency, money orders, vouchers and the like. It will be understood by someone with ordinary skill in the art that postage indicia is one type of value-bearing item.

It will be understood by someone with ordinary skill in the art that "IBIP" is an acronym for the "Information Based Indicia Program" provided by the United States Postal Service ("USPS"). The IBIP facilitates remote user-printing of computer-based Postage, also sometimes referred to as PC-based (Personal Computer based; also sometimes referred to herein as PC Postage), or Internet-based, Postage. In a typical Internet-based postage system, a user can purchase postage credit, and print the postage in the form of PC Postage onto a label or directly onto a mail piece at a printer connected to the user's own computer (that is remote to the Internet-based postage system).

It will be understood by someone with ordinary skill in the art that there are different types of IBIP postage. One type of IBIP postage is recipient-address specific and is date sensitive/date specific. Another type of IBIP postage is "generic" in that it is neither recipient-address specific nor date sensitive/date specific.

The terms "generic postage," "generic Internet postage", "computer-based generic IBIP postage", "computer-based, generic postage indicia", and "computer-based postage" may be used synonymously and/or interchangeably herein to refer to postage that is non-recipient specific and/or non-date specific.

Even though remote user-printing of computer-based, generic, value-bearing items has been available, such remote user-printing of computer-based, generic, value-bearing items has been available for remote user-printing on standardized label stock. Such standardized label stock may bear an image. However, images on such standardized label stock have been images that have not been user-supplied images, but rather have been, for example, watermark printed images produced en mass for sale to many users.

Image-customized, value-bearing-item indicia-bearing labels, such as, for example, image-customized postage-indicia-bearing labels have been publicly available for some time. For example, Stamps.com Inc. provides image-customized postage-indicia-bearing labels under the name of PHOTOSTAMPS®. U.S. patent application Entitled: "IMAGE-CUSTOMIZATION OF COMPUTER-BASED VALUE-BEARING ITEMS"; application Ser. No. 10/994,698, filed on Nov. 22, 2004 and its entire contents and disclosure is incorporated by reference in full herein for all purposes as if fully stated here.

However, image-customized postage-indicia-bearing labels such as provided by PHOTOSTAMPS® must be ordered already bearing postage indicia.

Therefore, even though remote user-printing of computer-based, generic, value-bearing items has been available and even though image-customized, value-bearing-item indicia-bearing labels have been available, no means has been available for ordering image-customized labels adapted for receiving computer-based, generic, value-bearing item indicia such as, for example, computer-based, generic, postage indicia. Further, remote user-printing of computer-based, generic, value-bearing items has not been available on image-customized labels.

SUMMARY OF THE INVENTION

An exemplary embodiment of the present invention will provide a method using a computer, and a computer system, for providing image-customizing labels that are adapted for receiving computer-based, generic, value-bearing item indicia such as, for example, computer-based, generic, postage indicia. The exemplary embodiment of the present invention will comprise generating a display of a user interface screen that is adapted for receiving an order from a user for at least one image-customized label adapted for bearing a computer-based, generic, value-bearing item.

The exemplary embodiment of the present invention will further comprise receiving a first order through the user interface from a first user for at least one image-customized label, said order consisting of: 1) an indication of an image, and 2) an indication of a number of image-customized labels.

The exemplary embodiment of the present invention will further comprise obtaining an electronic image corresponding to the indication of the image, such as by uploading the image.

The exemplary embodiment of the present invention will further comprise receiving a quality-assurance review indicator corresponding to the representation of the electronic image obtained as mentioned above, such as by uploading the image.

In the exemplary embodiment of the present invention, subsequent actions will depend on the results of quality assurance review. For a quality-assurance review indicator comprising a rejection corresponding to the representation of the electronic image, the ordering user will be notified that the image has been rejected. For a quality-assurance review indicator comprising an approval corresponding to the representation of the electronic image, the method will proceed as follows.

For each particular label of a first plurality of labels, a particular representation of an image-customized label corresponding to the particular label will be generated, wherein the particular representation of the image-customized label will be adapted for including a representation of a computer-based, generic, value-bearing item, and wherein the particular representation of the image-customized label will comprise a representation of the electronic image.

Then, for each particular representation of an image-customized label generated, a secured controlled paper representation of the particular representation of the image-customized label will be rendered on a label portion of a label stock.

In the exemplary embodiment of the present invention, once a secured controlled paper representation of the particular representation of the image-customized label has been rendered on a label portion of a label stock, the label portion of the label stock will be transmitted, such as, for example, by shipping or mailing, to a person or entity as designated by the ordering user. The person or entity to which the label portion is transmitted (the "designated receiving user") may be the ordering user or some other person or entity.

In the exemplary embodiment of the present invention, once the designated receiving user has received the label portion, the designated receiving user will be able to enter, and the exemplary method will comprise receiving from the designated receiving user, a request for a computer-based, generic, value-bearing item, such as, for example, a request for computer-based, generic postage, for printing on the label portion.

The exemplary embodiment of the present invention will further comprise, in response to receiving such a request, generating a computer-based, generic, value-bearing item indicia, such as, for example, postage indicia.

In some exemplary embodiments of the present invention, a user will be able to order, and a user interface will be provided for ordering, one or more sheets of image-customized labels comprising a particular user-provided or user-indicated image; there will be one image per sheet and one image per order.

In other exemplary embodiments of the present invention, a user will be able to order, and a user interface will be provided for ordering, one or more sheets of image-customized labels comprising a plurality of user-provided or user-indicated images; there will be a plurality of images per sheet and a plurality of images per order.

In a further variation exemplary embodiment, each sheet of labels will comprise labels bearing a single image, but the order may comprise a plurality of images.

In further variation exemplary embodiments, image-customized labels will be transmitted to the ordering user or the designated receiving user, as the case may be, on rolls of labels.

BRIEF DESCRIPTION OF THE DRAWINGS

These and other features, aspects, and advantages of the present invention will become better understood with regard to the following description, appended claims, and accompanying drawings in which:

FIG. 4 is a graphic representation depicting an exemplary user interface "Upload New Image from My PC" option display in an exemplary embodiment of the present invention;

FIG. 5 is a graphic representation depicting an exemplary user interface Order Completion display in the exemplary embodiment of the present invention;

DETAILED DESCRIPTION OF THE INVENTION

It will be understood by someone with ordinary skill in the art that although the exemplary embodiment of the present invention is described with respect to providing image-customized labels adapted for receiving USPS-approved, image-customized computer-based IBIP generic postage labels, the invention would apply equally to image-customization of labels adapted for receiving other types of VBI.

Figure 1:
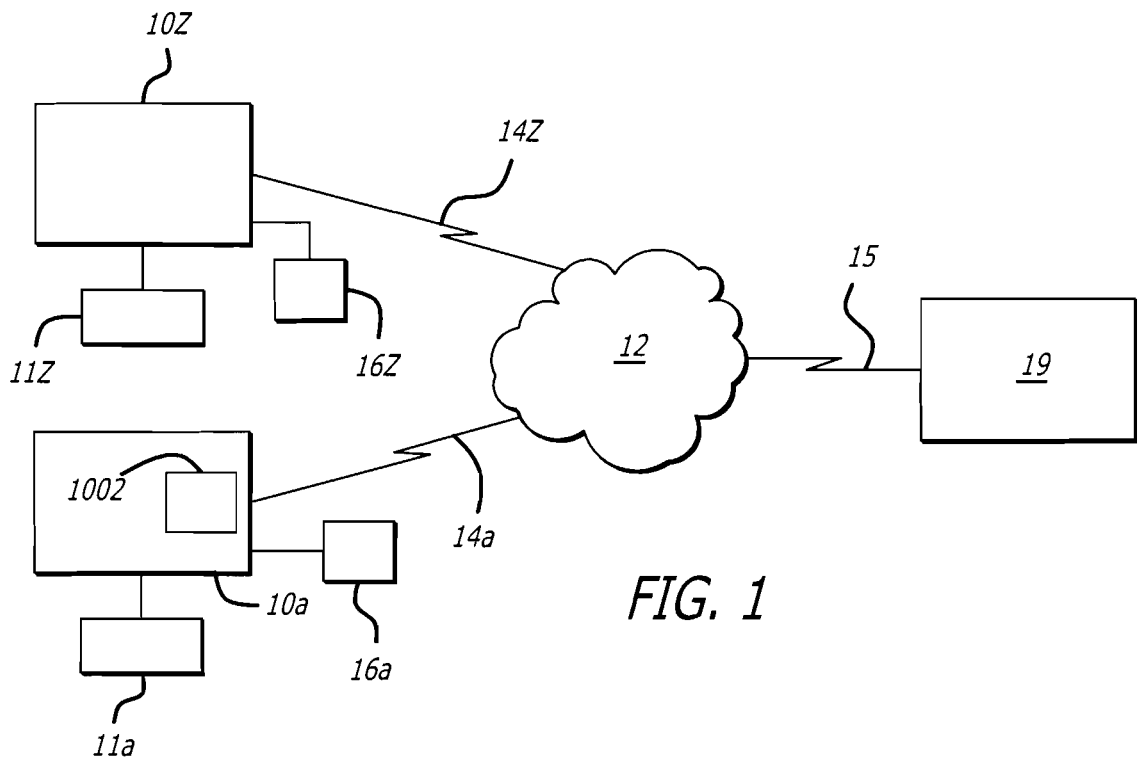
FIG. 1 is a block diagram depicting an exemplary Internet user client/server environment for the exemplary image-customizing label computer system in an exemplary embodiment of the present Invention.

FIG. 1 is a block diagram depicting an exemplary Internet user client/server environment for the exemplary image-customizing label computer system in an exemplary embodiment of the present Invention. It will be understood by someone with ordinary skill in the art that although the exemplary embodiment of the present invention is described in the context of an Internet-based embodiment, that the present invention is not limited to Internet-based applications.

It will be further understood by someone with ordinary skill in the art that many of the functions described herein could alternatively be performed by client software or server software. The print rendering of the image-customized labels is contemplated as being performed in the exemplary embodiment at a centralized printer. However, it would be possible in alternative embodiments to facilitate polychromatic printing of image-customized labels at user-client-controlled printers without departing from the spirit of the present invention.

With reference to FIG. 1, user client devices 10a-10z (sometimes referred to herein simply as "client", "clients" or "client computers") and a label customization website 19 will engage in two-way communication via a communication network 12.

In the exemplary embodiment, communication network 12 will comprise the Internet. However, it will be understood by those skilled in the art that the communication network may take many different forms, such as a local area network (LAN), wide area network (WAN), wired telephone network, wireless network, or any other network that supports data communication between respective entities.

Clients 10a-10z may embody one of a variety of different forms. In one illustrative embodiment, one or more of Clients 10a-10z may comprise personal computers; other of Clients 10a-10z may comprise computers or any other device, whether now known or in the future discovered, that has processing capabilities and that may engage in communication over a communications network such as communication network 12.

Each respective client device 10a-10z will be in communication with a respective display device 11a-11z. Each respective display device, e.g., in the example using client 10a, display device 11a, will be integral to, or connected to, or otherwise in communications with, the respective client device, e.g., 10a. Clients 10a-10z will be in communications with the communication network 12 through communication links 14a-14z. A communication link e.g., 14a, could comprise a wireless communication, a dedicated line connection, cable communication, satellite communication, telephone communication, or any other type of communication now known or in the future discovered. In addition, each client, e.g., client 10a, may have access to a printer, such as, for example, printer 16a. Optionally, a local network may serve as the connection between some of the clients and the Internet 12.

The label customization website 19 will also be in communication with the Internet via one or more communication links, e.g., 15. As with communication links 14a-14z between the client devices 10a-10z respectively, communication links, e.g., 15, between the label customization website 19 and the Internet could comprise a wireless communication, a dedicated line connection, cable communication, satellite communication, telephone communication, or any other type of communication now known or in the future discovered.

A web browser 1002, such as, for example, NETSCAPE NAVIGATOR®, or MICROSOFT INTERNET EXPLORER®, or some other web browser software, will be installed on each client device, e.g. 10a. Reference herein to web browser 1002 should not be read as referring to any particular web browser brand. Further, reference to a web browser 1002 should not be read as implying that every client computer, e.g., 10a through 10z, all use the same web browser. Rather, each client computer 10a through 10z will have one web browser, that could be selected from various web browsers, whether now known or in the future discovered, with which to control communications between the respective client device, e.g., 10a, and the Internet. Further, it will be understood by someone with ordinary skill in the art that the invention will apply to any computer program or set of computer instructions, whether a web browser or some other software now known or in the future discovered, that is adapted to allow a user to retrieve and render hyper-media content from one or more server computers available for communication via a communications network, such as the Internet.

It should be noted that the use of suffixes such as "a" through "z" in connection with numbered elements of the FIGURES herein are exemplary and are not a limitation of the invention to any particular number. Rather, the suffixes "a" through "z", and similar notations, are used herein to an unknown number of similar elements; although the number is unknown, the "a" through "z" suffix notation is used to express a representation of 1 to many.

Communications between a client computer, e.g., 10a, and the label customization website 19 will be provided via secured eCommerce communications, such as through SSL; HTTPS, which stands for "Hypertext Transfer Protocol over Secure Socket Layer", is an acronym that is often used to describe such a secured eCornmerce communications. However, it will be understood by someone with ordinary skill in the art that reference to SSL or HTTPS herein is not a limitation of the invention. Rather, other communication protocols, whether now known or in the future discovered, could be used.

SSL stands for "Secure Sockets Layer," a protocol developed by NETSCAPE® for transmitting private documents via the Internet. SSL works by using a private key to encrypt data that is then transferred over the SSL connection. Both NETSCAPE NAVIGATOR® and MICROSOFT INTERNET EXPLORER® web browsers, support SSL; many websites use SSL protocol to protect the exchange of confidential user information, such as credit card numbers.

In the exemplary embodiment, a user will use a client device, e.g., client computer 10a, to access the label customization website 19 to input an order for image-customized labels.

When a user using a client device, e.g., client computer 10a, accesses the label customization website 19 to input an order for image-customized labels, the exemplary embodiment of the present invention will comprise generating a display of one or more user interface screens that are adapted for receiving an order from a user for at least one image-customized label adapted for bearing a computer-based, generic, value-bearing item such as a computer-based, generic postage indicia.

Upon accessing the label customization website 19, an accessing user would input a user-identifier and password, such as on a homepage (not shown). The exemplary embodiment would authenticate the user, or if the user was a new user, would provide a user registration process, which would result in the user indicating a user identifier and a user password.

Once a user has properly registered and signed in, the exemplary embodiment would display certain preliminary user interface screens (not shown), by which the user could, for example, indicate that the user intends to place an order for image-customized postage labels. Once a user has indicated that the user intends to place an order for image-customized postage labels, the exemplary embodiment would present an exemplary user interface screen by which the user could input specification for such an order.

Figure 11:
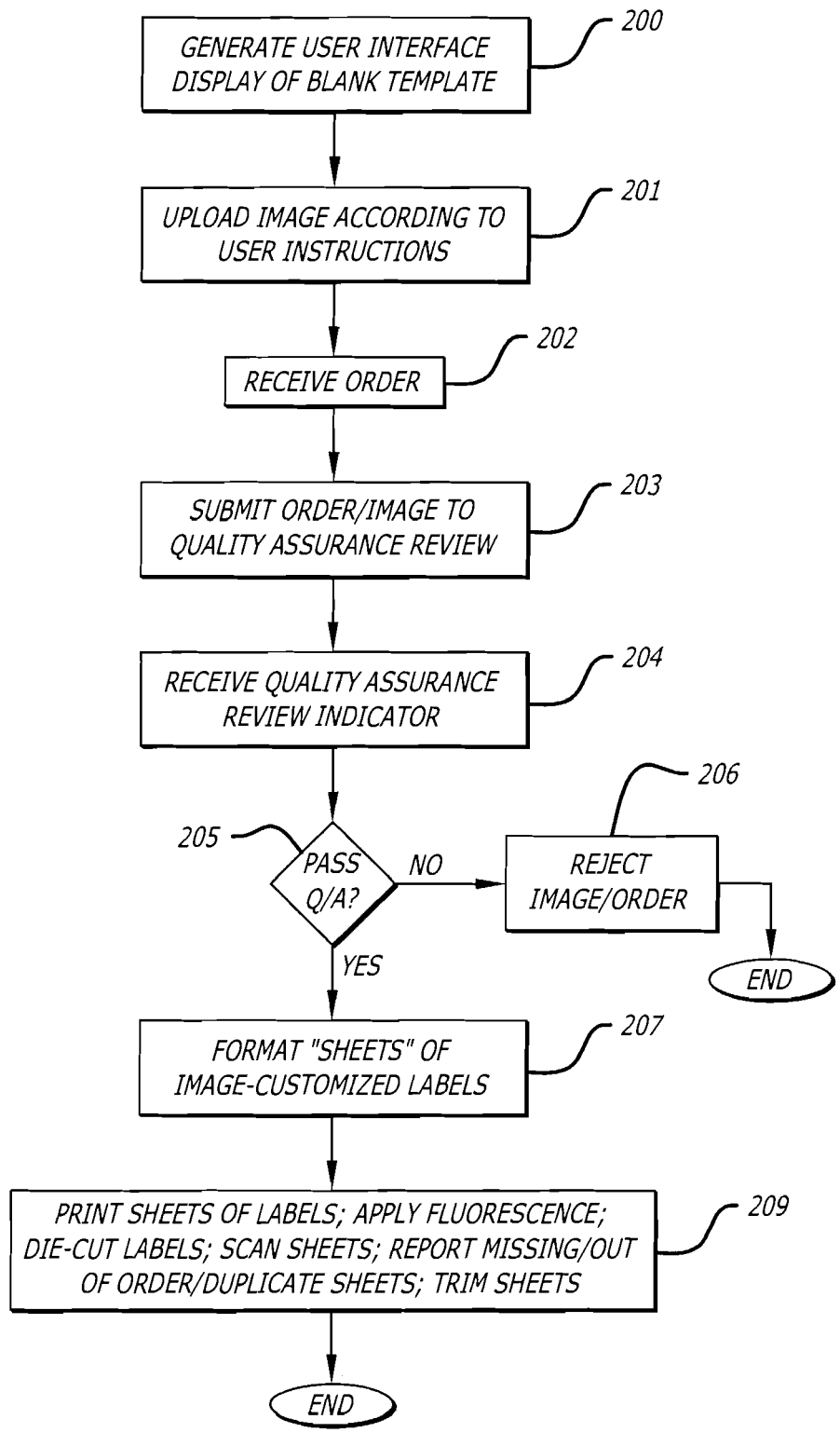
FIG. 11 is a high-level flow diagram depicting exemplary high-level logic functions in an exemplary embodiment of the present invention.

FIG. 11 is a high-level flow diagram depicting exemplary high-level logic functions in an exemplary embodiment of the present invention.

Figure 2B:
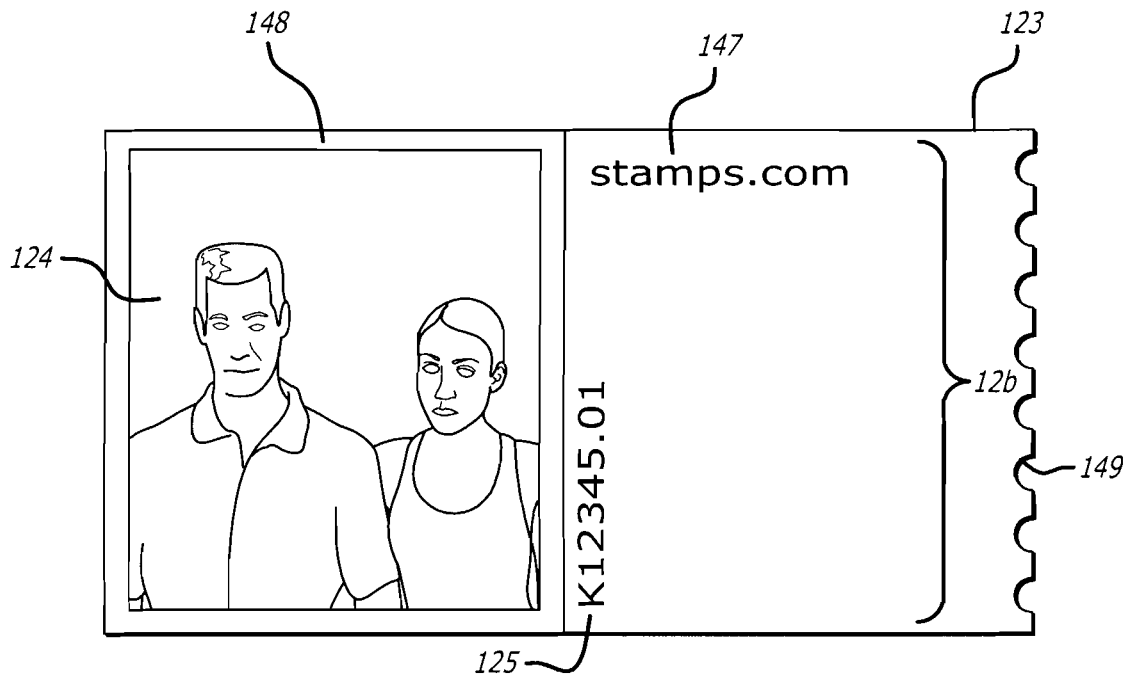
FIG. 2B is a graphic representation depicting an exemplary label that would be printed as a result of an order for image-customized labels in an exemplary embodiment of the present invention.
Figure 2A:
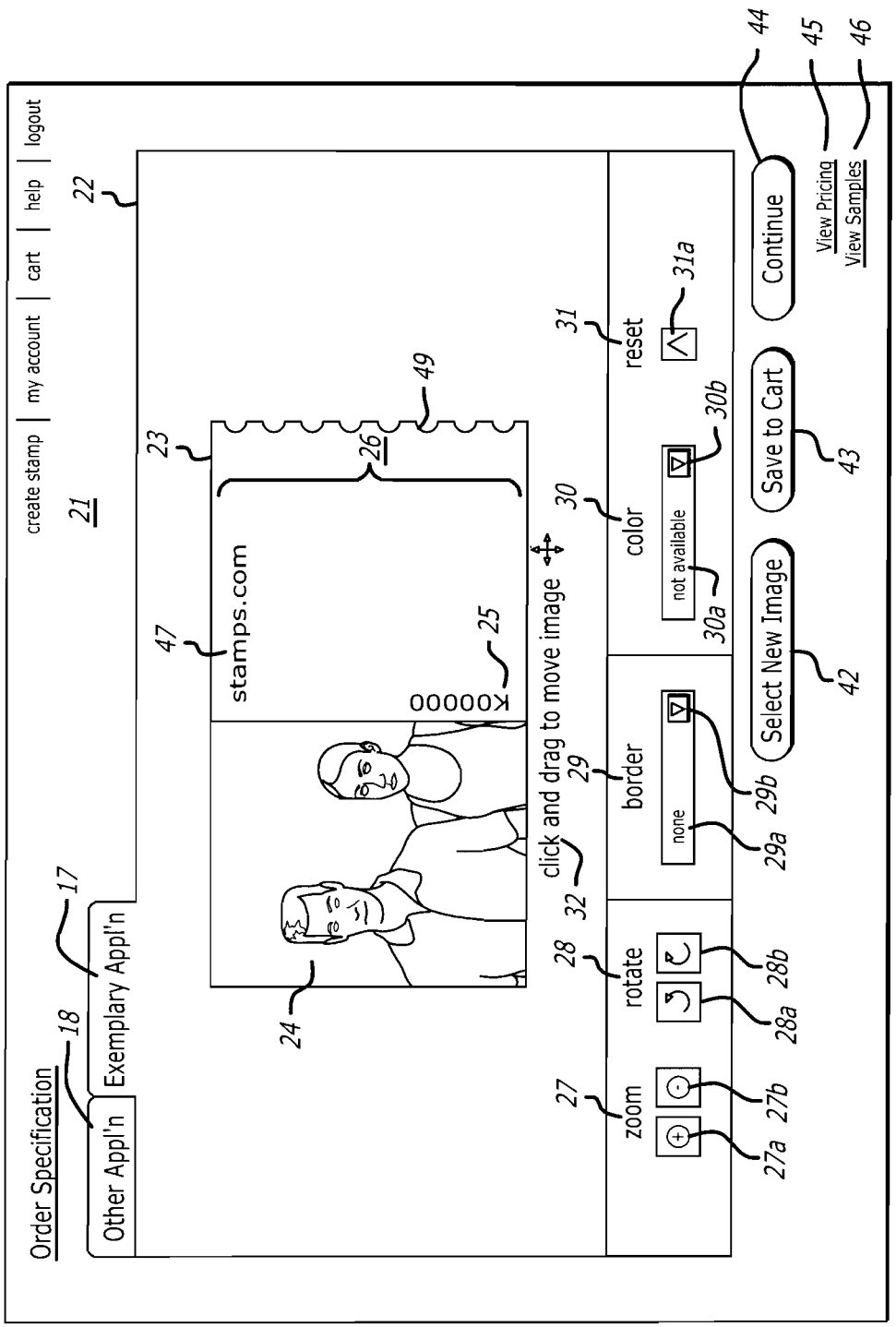
FIG. 2A is a graphic representation of an exemplary user interface Order Specification screen in an exemplary embodiment of the present invention.

FIG. 2A is a graphic representation of an exemplary user interface Order Specification screen 21 that would be generated (see function 200 in FIG. 11) by the exemplary embodiment of the present invention. With reference to FIG. 2A, in the exemplary embodiment, the exemplary user interface Order Specification screen 21 would display two or more options, such as, for example, the "Exemplary Application" option 17, and an "Other Application" option 18. If the "Exemplary Application" option 17 is selected, or otherwise displayed, the exemplary embodiment would display an exemplary user interface Exemplary Application display 22 as depicted in FIG. 2A. In the exemplary embodiment, the exemplary user interface Exemplary Application display 22 would present an exemplary display of an exemplary image-customized label 23 of the present invention.

FIG. 2B is a graphic representation depicting an exemplary label 123 that would be printed as a result of an order for image-customized labels.

With reference to FIG. 2A, the exemplary display of an exemplary image-customized postage label 23 will bear an image 24 that would be provided by a corresponding user when placing an order for image-customized labels. The exemplary display of an exemplary image-customized postage label 23 will also provide an exemplary blank area 26, which, in the exemplary embodiment is to the right of the image 24. Exemplary blank area 26 depicts a blank area (e.g., element 126 depicted on FIG. 2B) that would be provided on a physical image-customized label (e.g., element 123 depicted on FIG. 2B) that would be printed (or otherwise produced) as a result of an order for image-customized labels. In the exemplary embodiment, the blank area 26 (and the blank area 126 on the physical image-customized label) would be adapted for receiving (and bearing) a computer-based, generic, postage indicia.

Unlike image-customized postage-indicia-bearing labels as, e.g., disclosed in U.S. patent application Entitled: "IMAGE-CUSTOMIZATION OF COMPUTER-BASED VALUE-BEARING ITEMS"; application Ser. No. 10/994, 698, filed on Nov. 22, 2004 (the entire contents and disclosure of which has previously been incorporated by reference in full herein for all purposes as if fully stated here), in the exemplary embodiment of the present invention, image-customized labels would be produced based on a particular user's order but would not bear any postage indicia; the postage indicia would be applied by a user's printer at a time subsequent to production of the image-customized labels.

With reference to FIG. 2A, the exemplary display of an exemplary image-customized postage label 23 will also provide an exemplary display of a mock serial number 25. The exemplary display of an exemplary image-customized postage label 23 will also provide an exemplary provider name identifier 47. The exemplary provider name identifier 47 would represent the name of the entity that would produce the image-customized label in response to a user's order.

In the exemplary embodiment, the exemplary display of a mock serial number 25 would be provided to show eventual placement on a physical image-customized label of an actual serial number (see, e.g., exemplary serial number 125 on FIG. 2B) that will be generated once an order has been placed for printing on the physical image-customized label With reference to FIG. 2A, in the exemplary embodiment, if the user had not already indicated an image to be used, then image 24 would be blank. In order to facilitate selecting an image, indicating a new image, or if the user has not yet input an image, inputting an image, the exemplary user interface Order Specification screen 21 will provide a means, such as, for example, an exemplary online Select New Image button 42, by which the user would navigate to a means for uploading one or more images and/or selecting an image for use in placing an order.

If a user clicks on the exemplary online Select New Image button 42, the exemplary embodiment would present a user interface display of the images that the user had previously uploaded.

Figure 3:
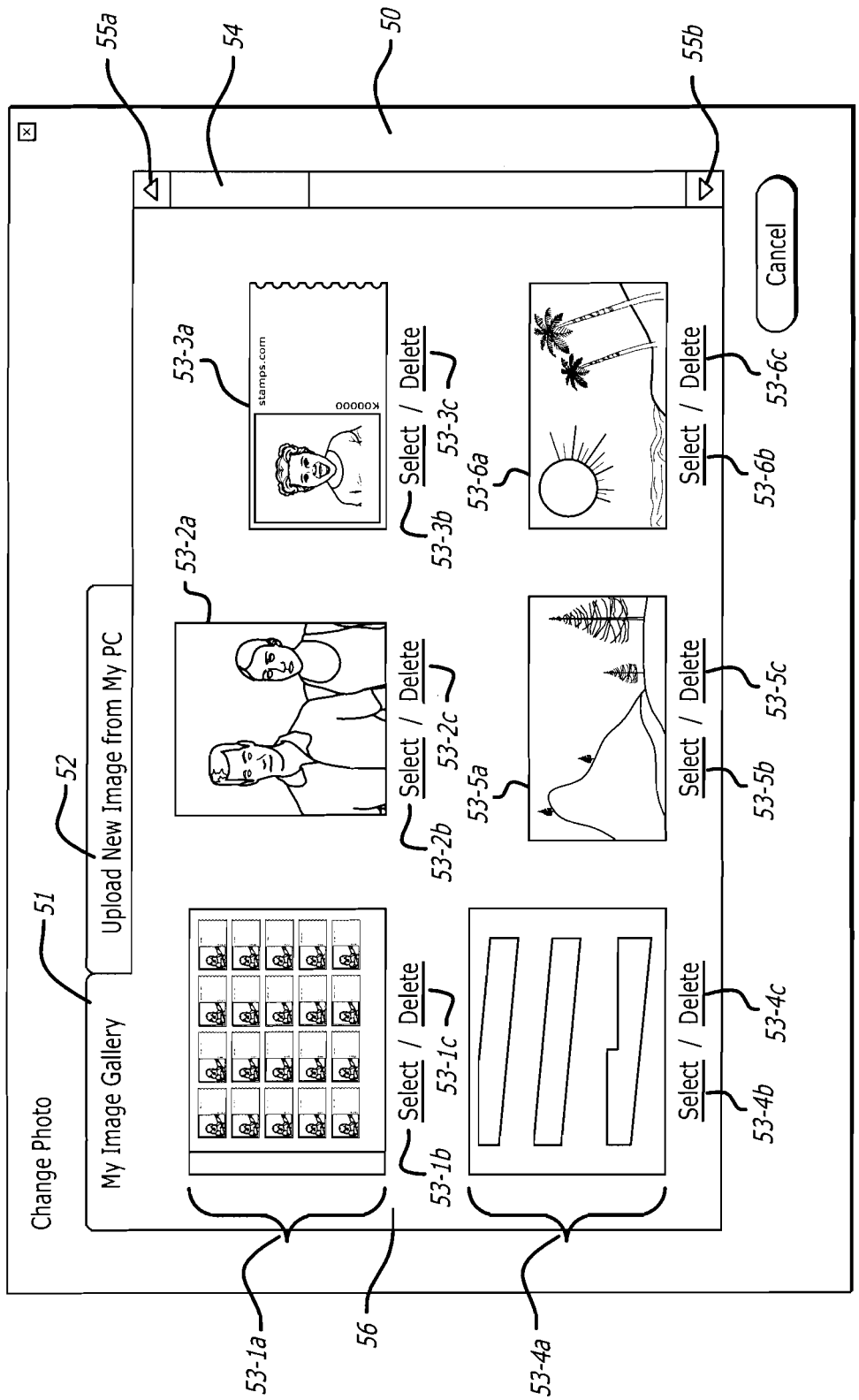
FIG. 3 is a graphic representation depicting an exemplary user "Change Photo" interface display in an exemplary embodiment of the present invention.

FIG. 3 is a graphic representation depicting an exemplary user "Change Photo" interface display 50.

It will be understood by someone with ordinary skill in the art that the exemplary graphic user interface screens depicted herein with respect to a description of the exemplary embodiment of the present invention are illustrative and non-limiting; that various alternative means for interacting with a user could be provided without departing from the spirit of the present invention. For example, it will be understood by someone with ordinary skill in the art that various ways could be used to prompt a user to select an image previously provided or uploaded by the user, or, if the user had not previously uploaded images, to prompt the user to upload an image.

Returning with reference to FIG. 3, the exemplary user interface "Change Photo" display 50 would provide two exemplary options: a "My Image Gallery" option 51 and an "Upload New Images from My PC" option 52.

If the "My Image Gallery" option 51 is selected or otherwise displayed, an exemplary user interface "My Image Gallery" option display 56 would be presented that would display all of the exemplary images 53-1a, 53-2a, 53-3a, 53-4a, 53-5a, and 53-6a, that the user has previously uploaded. If the user has uploaded more images than can be displayed at once, the exemplary user interface "My Image Gallery" option display 56 would provide an online sliding key 54, and up 55a and down 55b buttons, that the user would be able to use to advance though all of the images that the user had previously uploaded.

For each image, e.g., 53-1a, 53-2a, 53-3a, 53-4, 53-5a, and 53-6a, that the user had previously uploaded, a "Select" and "Delete" option, e.g., 53-1b and c, 53-2b and c, 53-3b and c, 53-4b and c, 53-5b and c, and 53-6b and c, respectively, would be provided.

If, for a particular image, e.g., 53-1a, the user clicked the corresponding "Delete" option, e.g., 53-1c, the exemplary embodiment of the present invention would delete the image from the collection of images associated with the user and would delete the image from the images database of the exemplary embodiment; the deleted image would no longer be displayed in the exemplary user interface "My Image Gallery" option display 56.

If, for a particular image, e.g., 53-1*a*, instead of clicking the "Delete" option, e.g., 53-1*c*, the user clicked the corresponding "Select" option, e.g., 53-1*b*, the exemplary embodiment of the present invention would return to a display of the exemplary user interface Exemplary Application screen 22 as depicted in FIG. 2A, and would present the image, e.g., 53-*la* that corresponded to the clicked "Select" option, e.g., 53-*lb*, as the image 24 in FIG. 2A depicted in the exemplary image-customized postage label 23.

Before continuing with further description of the exemplary user interface Exemplary Application display 22 depicted in FIG. 2A, if the user had not previously uploaded any images, then the exemplary user interface "My Image Gallery" option display 56 depicted in FIG. 3 would be blank; the user would be able to click on the exemplary "Upload New Image from My PC" option 52 to upload an image.

Whether or not the user had previously uploaded images, the exemplary embodiment would provide the exemplary "Upload New Image from My PC" option 52 depicted in FIG. 3. If the user clicked on the exemplary "Upload New Image from My PC" option 52, the exemplary embodiment of the present invention would present an exemplary user interface "Upload New Image from My PC" option display 60 as depicted in FIG. 4.

The exemplary user interface "Upload New Image from My PC" option display 60 would provide a "Browse" button 61, and an image location input field 62. A user would be able to click on the "Browse" button 61 to browse and identify locations at which an image may be located for uploading. Alternatively, the user could key in a location at which an image to be uploaded into image location input field 62. Once a location is identified in the image location input field 62, the user could then click the "Upload" button 63.

Once a location is identified in the image location input field 62, if the user clicks the "Upload" button 63, the exemplary embodiment would upload (see function 201 depicted in FIG. 11) an electronic copy, such as, for example, a digital copy, of the image from the location identified in the image location input field 62; the exemplary embodiment would save the uploaded electronic copy of the image into an image database accessible by the exemplary embodiment; and the exemplary embodiment would save an indication of a user identifier with the electronic copy of the image saved in the image database.

It will be understood by someone with ordinary skill in the art that the above-described means for uploading and saving an electronic copy of images is exemplary and that alternative means for obtaining images with which to complete image-customization orders would be possible without departing from the spirit of the present invention. For example, instead of uploading an electronic copy of an image at the time that the user identifies a location of the image, an alternative embodiment of the present invention could save an address or other location identifier for the image with an identifier for the user in a database; an electronic copy of the image could be uploaded if and when the user selected the image for a particular order.

Returning with reference to the exemplary embodiment, once an electronic copy of an image has been uploaded and saved along with the identifier corresponding to the uploading user in the image database, the exemplary embodiment would return control to the exemplary user interface "Upload New Image from My PC" option display 60. The user could then browse and upload additional images, or could click the exemplary "My Image Gallery" option 51 to return to the exemplary user interface "My Image Gallery" option display 56 depicted in FIG. 3.

Returning to the exemplary user interface "My Image Gallery" option display 56 depicted in FIG. 3, the user could then click the "Select" option, e.g., "Select" 53-1*b*, corresponding to one of the images, e.g., image 53-1*a*, depicted in the exemplary user interface "My Image Gallery" option display 56. The exemplary embodiment of the present invention would then return to a display of the exemplary user interface Exemplary Application screen 22 as depicted in FIG. 2A, and would present the image selected by the user from the exemplary user interface "My Image Gallery" option display 56 depicted in FIG. 3, e.g., 53-1*a* that corresponded to the clicked "Select" option, e.g., 53-1*b*; the selected image would be displayed as the image 24 in FIG. 2A depicted in the exemplary image-customized postage label 23.

Continuing with reference to FIG. 2A, once a user had selected an image 24 for an order, the exemplary embodiment would provide various means for manipulating the image for the order.

For example, the exemplary embodiment would provide exemplary image zoom means 27, such as, for example, an exemplary zoom-in (magnify; "+") option 27*a*, and an exemplary zoom-out (reduce; "−") option 27*b*. If a user clicked on the exemplary zoom-in option 27*a*, the exemplary embodiment would present a magnification of the image 24 in the exemplary display of the exemplary image-customized label 23. If the user clicked on the exemplary zoom-out option 27*b*, the exemplary embodiment would present a reduced-size of the image 24 in the exemplary display of the exemplary image-customized label 23.

The exemplary embodiment would provide exemplary image rotate means 28, such as, for example, an exemplary rotate counterclockwise option 28*a* and an exemplary rotate clockwise option 28*b*. If a user clicked on the exemplary rotate counterclockwise option 28*a*, the exemplary embodiment would present a counterclockwise rotation of the image 24 in the exemplary display of the exemplary image-customized label 23. If the user clicked on the exemplary rotate clockwise option 28*b*, the exemplary embodiment would present a clockwise rotation of the image 24 in the exemplary display of the exemplary image-customized label 23.

The exemplary embodiment would provide an exemplary border indication means 29, such as, for example, an exemplary border option pull-down menu button 29*b* that would allow a user to select a display border option. If a user clicked the exemplary border option pull-down menu button 29*b*, an exemplary pull-down menu of display border options (not shown) would be displayed over the border option field 29*a*, from which the user could select, such as by clicking, highlighting, or other means, a particular border graphic option. The selected border option would appear in the display border option field 29*a* and would be used by the exemplary embodiment to present a border graphic (a graphic "frame") around the image 24. Because the border option "none" is indicated in FIG. 2A, the exemplary image-customized label 23 depicted in FIG. 2A does not depict any border around exemplary image 24. Exemplary border options, other than "none" could include, for example, a list of border graphics, such as solid, cross-hatching and the like.

The exemplary embodiment would provide exemplary border color selection means 30, such as, for example, a border color pull-down menu button 30*b* and a border color indication field 30a. If a user clicked the exemplary border color pull-down menu button 30b, an exemplary pull-down menu of border color options (not shown) would be displayed over the color indication field 30a, from which the user could select, such as by clicking, highlighting, or other means, a particular border color option. The selected border color option would appear in the display border option field 29a and would be used by the exemplary embodiment to present a border color of the corresponding border graphic around the image 24. In FIG. 2A, because the border option of "none" is indicated in the border option field 29a, the border color indication field 30a is depicted as indicating "not available."

The exemplary embodiment would provide an exemplary resent means 31, such as, for example, "reset" button 31a. Clicking the exemplary "reset" button 31a in the exemplary embodiment would reset the image 24 to the original uploaded image selected by the user from the exemplary user interface "My Image Gallery" option display 56 depicted in FIG. 3, e.g., 53-1a, that corresponded to the clicked "Select" option, e.g., 53-1b. In alternative embodiments, clicking a "reset" button 31a could successively reset the displayed image 24 to a prior set of manipulation options.

The exemplary embodiment would provide a "click and drag to move image" feature 32 that would allow the user to click on the image 24 and drag it up, down, left or right to reposition the image 24 on the exemplary image-customized label 23. In the exemplary embodiment, use of the "click and drag" feature 32 would have the effect of cropping the image.

Once a user is satisfied with the image 24, the user could click the "View Pricing" option 45 to view prices for ordering certain quantities of the exemplary image-customized label 23 depicted in FIG. 2A. The user could also click the "View Samples" option 46 to view samples of sheets, (or rolls) of the exemplary image-custornized label 23 depicted in FIG. 2A. The user could also click the "Save to Cart" button 43 to cause the specifications for the exemplary image-customized label 23 to be saved to the user's "Cart" for later completion of the order. Alternatively, the user could click the "Continue" option 44 to navigate to an exemplary user interface Order Completion display.

FIG. 5 is a graphic representation depicting an exemplary user interface Order Completion display 70 in the exemplary embodiment of the present invention. In the exemplary embodiment, the exemplary user interface Order Completion display 70 would provide a sheet order indicator 71 which a user would check (by clicking) to indicate that image-customized labels would be ordered in sheets. If a user indicated that sheets of labels would be ordered by checking sheet order indicator 71, then the user would also complete an exemplary number of sheets input field 72, either by inputting a number, or, alternatively, by clicking on an exemplary number of sheets pull-down menu button 73. If the user clicked on the exemplary number of shoots pull-down menu button 73, a pull down menu (not shown) of numbers of sheets would appear over the exemplary number of sheets input field 72; the user would click one of the numbers of sheets selections in the pull-down menu of numbers of sheets to select a number of sheets to be input in exemplary number of sheets input field 72 and ordered.

In the exemplary embodiment, the exemplary user interface Order Completion display 70 would further provide an exemplary roll order indicator 74 which a user would check (by clicking) to indicate that image-customized labels would be ordered in rolls. If the user indicated that rolls of image-customized labels would be ordered by checking the exemplary roll order indicator 74, then the user would need to identify the number of labels per roll in the exemplary labels per roll input field 75. In the exemplary embodiment, an exemplary number of labels per roll pull-down menu button 76 would be provided. In order to identify a number of labels per roll to be ordered, a user would click the exemplary number of labels per roll pull-down menu button 76, which would cause an exemplary number of labels per roll pull-down menu (not shown) to be displayed over the exemplary labels per roll input field 75. Once the exemplary number of labels per roll pull-down menu (not shown) was displayed, the user would click one of the exemplary number of labels per roll selections listed in the exemplary pull-down menu to select a number of labels per roll to be input in the exemplary labels per roll input field 75 and ordered.

In the exemplary embodiment, the exemplary user interface Order Completion display 70 would further provide an exemplary number of rolls input field 77 and exemplary number of rolls pull-down menu button 78. In the exemplary embodiment, if the user had indicated that rolls of image-customized labels would be ordered by checking the exemplary roll order indicator 74, then the user would also need to identify the number of rolls to be ordered. In the exemplary embodiment, a user could identify the number of rolls to be ordered by entering a number in the exemplary number of rolls input field 77. Alternatively, a user could identify the number of rolls to be ordered by clicking on the exemplary number of rolls pull-down menu button 78 and making a selection from an exemplary number of rolls pull-down menu (not shown) that would be displayed over exemplary number of rolls input filed 77.

In the exemplary embodiment, the exemplary user interface Order Completion display 70 would further provide an exemplary Credit Card pull-down menu button 80 and an exemplary Credit Card input field 79. A user could input the type of credit card (e.g., Master Card, VISA, Discover, American Express, etc.) into the exemplary Credit Card input field 79 by clicking on the exemplary Credit Card pull-down menu button 80, which would cause an exemplary Credit Card type pull-down menu (not shown) to be displayed over the exemplary Credit Card input field 79. The user could identify the Credit Card type by clicking on one of the credit card types listed in the exemplary Credit Card type pull-down menu (not shown), which would cause the selected credit card type to be input into the exemplary Credit Card input field 79.

In the exemplary embodiment, the exemplary user interface Order Completion display 70 would further provide an exemplary Credit Card Number input field 81 into which a user would input the credit card number to be billed for the order.

In the exemplary embodiment, the exemplary user interface Order Completion display 70 would also provide an exemplary Shipping Address input field for completion by the user if the Shipping Address would be different than the user's address.

In the exemplary embodiment, the exemplary user interface Order Completion display 70 would further provide an exemplary Return button 82 (to be clicked to return to the previous screen), an exemplary Submit button 83 (to be clicked to submit the order), and an exemplary Cancel button 83 (to be clicked to cancel the order).

Once a user has completed the exemplary user interface Order Completion display 70 input fields and clicked the Submit button 83, then the order would be submitted and the exemplary embodiment of the present invention would receive the order (see function 202 in FIG. 11).

It will be understood that the exemplary embodiment is described herein as facilitating one image per order. That is, a single image would be used to produce an order, whether on sheets or rolls, of image-customized labels. It will be further understood that the description herein of the single-image-per-order exemplary embodiment is illustrative and is not a limitation of the invention. For example, in an alternative exemplary embodiment, a single order could comprise a plurality of images.

Figure 6:
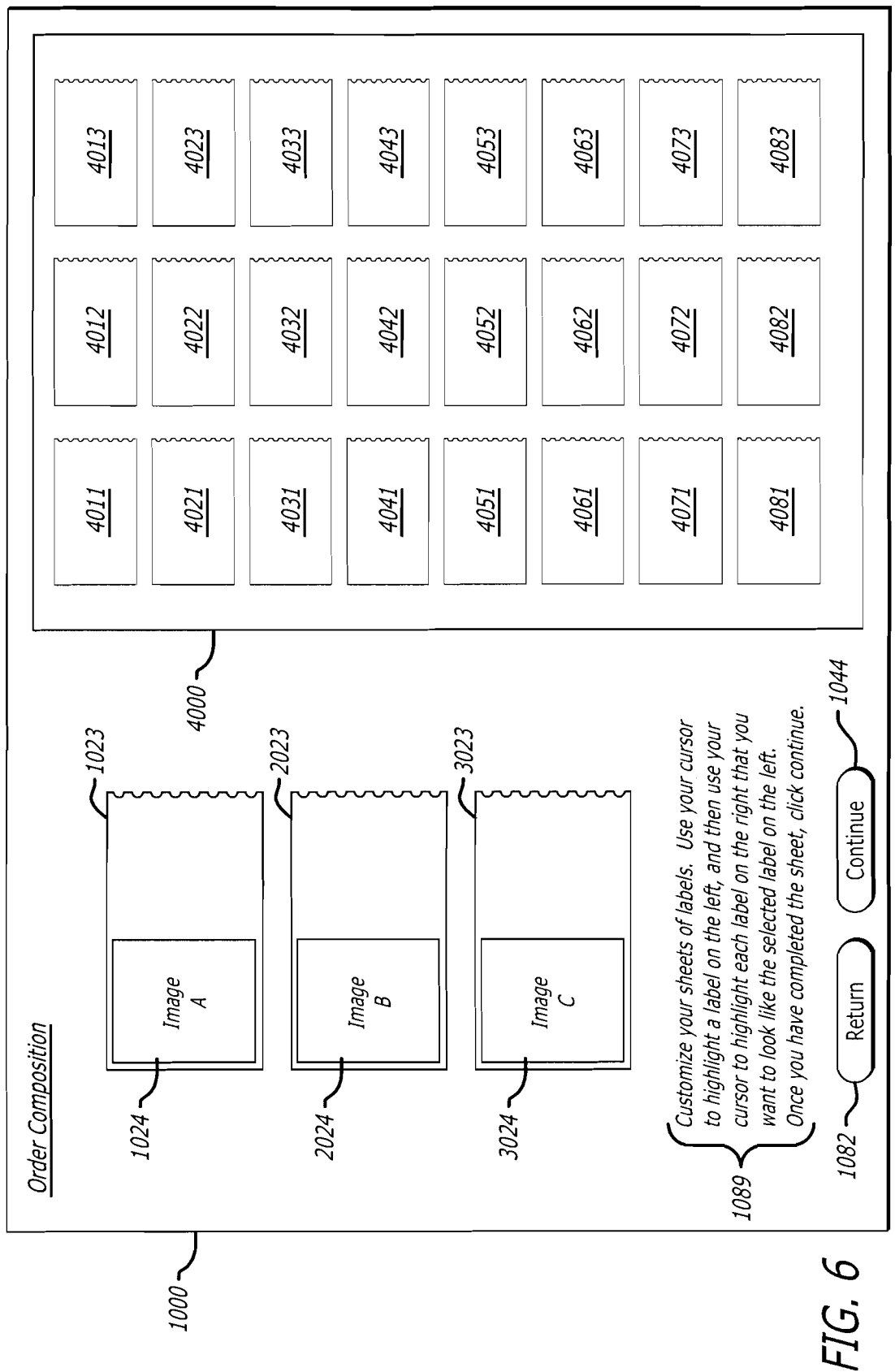
FIG. 6 is a graphic representation of an exemplary interactive Order Composition screen display in an alternative exemplary multi-image order embodiment of the present invention.

In one such alternative exemplary multi-image order embodiment, an interactive Order Composition screen display would be provided, such as the exemplary interactive Order Composition screen display 1000 depicted in FIG. 6.

The alternative exemplary multi-image order embodiment would facilitate a user using exemplary user interface Exemplary Application screen 22 as depicted in FIG. 2A to create a plurality of exemplary displays of an exemplary image-customized postage label 23; for each exemplary display of an exemplary image-customized postage label 23 created, the user would click the Save to Cart button before creating the next exemplary display of an exemplary image-customized postage label 23. Once the user had created all of the exemplary displays of an exemplary image-customized postage label 23 that the user wanted to use in an order, the user would click the Continue button 44.

In the alternative exemplary multi-image order embodiment, the user interface Exemplary Application screen (element 22 of FIG. 2A) of the user interface Order Specification screen (element 21 of FIG. 2A) would, for example, provide indicators (not shown) for ordering rolls of labels or sheets of labels.

If a user indicated that the user would be ordering sheets of labels, then once the user had clicked the Continue button 44, the alternative exemplary multi-image order embodiment would present exemplary interactive Order Composition screen display 1000 depicted in FIG. 6. For each display of an exemplary image-customized postage label 23 that the user had saved to the user's cart, the exemplary interactive Order Composition screen display 1000 would present a corresponding display of the saved label. For example, in FIG. 6, three exemplary image-customized postage label displays 1023, 2023 and 3023 are depicted, each of which represents an exemplary image-customized postage label display (element 23 in FIG. 2A) that a particular user had saved to the user's cart before clicking the Continue button (element 44 in FIG. 2A). As depicted in FIG. 6, each of the three exemplary image-customized postage label displays 1023, 2023 and 3023 are depicted as comprising a distinct image, e.g., Image A 1024 in exemplary image-customized postage label display 1023; Image B 2024 in exemplary image-customized postage label display 2023; and Image C 3024 in exemplary image-customized postage label display 3023.

In the exemplary embodiment and the alternative exemplary multi-image order embodiment, each sheet of labels would comprise three columns and eight rows of labels. However, it will be understood by someone with ordinary skill in the art that the description herein of sheets of labels comprising a certain number of rows and columns is illustrative and non-limiting. In some further alternative embodiments, an interactive display of a number of different label sheet "footprints" could be presented, from which a user could select one "footprint" for an order. Each "footprint" would show a mock display of a certain size and format of a label and a sheet layout of those labels. Each "footprint" would be assigned a different "SKU" and could be associated with pricing particular to that "footprint." In such a multi-footprint embodiment, the SKU associated with the selected footprint would be associated with the order number that would be assigned by the embodiment to the order.

The exemplary interactive Order Composition screen display 1000 would also present an exemplary display of an exemplary sheet 4000 of exemplary postage labels 4011-4013, 4021-4023, 4031-4033, 4041-4043, 4051-4053, 4061-4063, 4071-4073, and 4081-4083. Initially, exemplary postage labels 4011-4013, 4021-4023, 4031-4033, 4041-4043, 4051-4053, 4061-4063, 4071-4073, and 4081-4083 would be displayed as blank, without any image.

The alternative exemplary multi-image order embodiment would display instructions to the user to first highlight, by e.g. clicking, one of the exemplary image-customized postage label display, e.g., 1023, 2023 or 3023 on the left, and then to highlight, such as, e.g., by clicking, each of the labels on the sheet that are to bear the image of the particular exemplary image-customized postage label display (e.g., 1023, 2023, or 3023) on the left. For example, the following instructions 1089 would be given: "Customize your sheets of labels. Use your cursor to highlight a label on the left and then use your cursor to highlight each label on the sheet on the right that you want to look like the selected label on the left. Once you have completed the sheet, click Continue."

Figure 7:
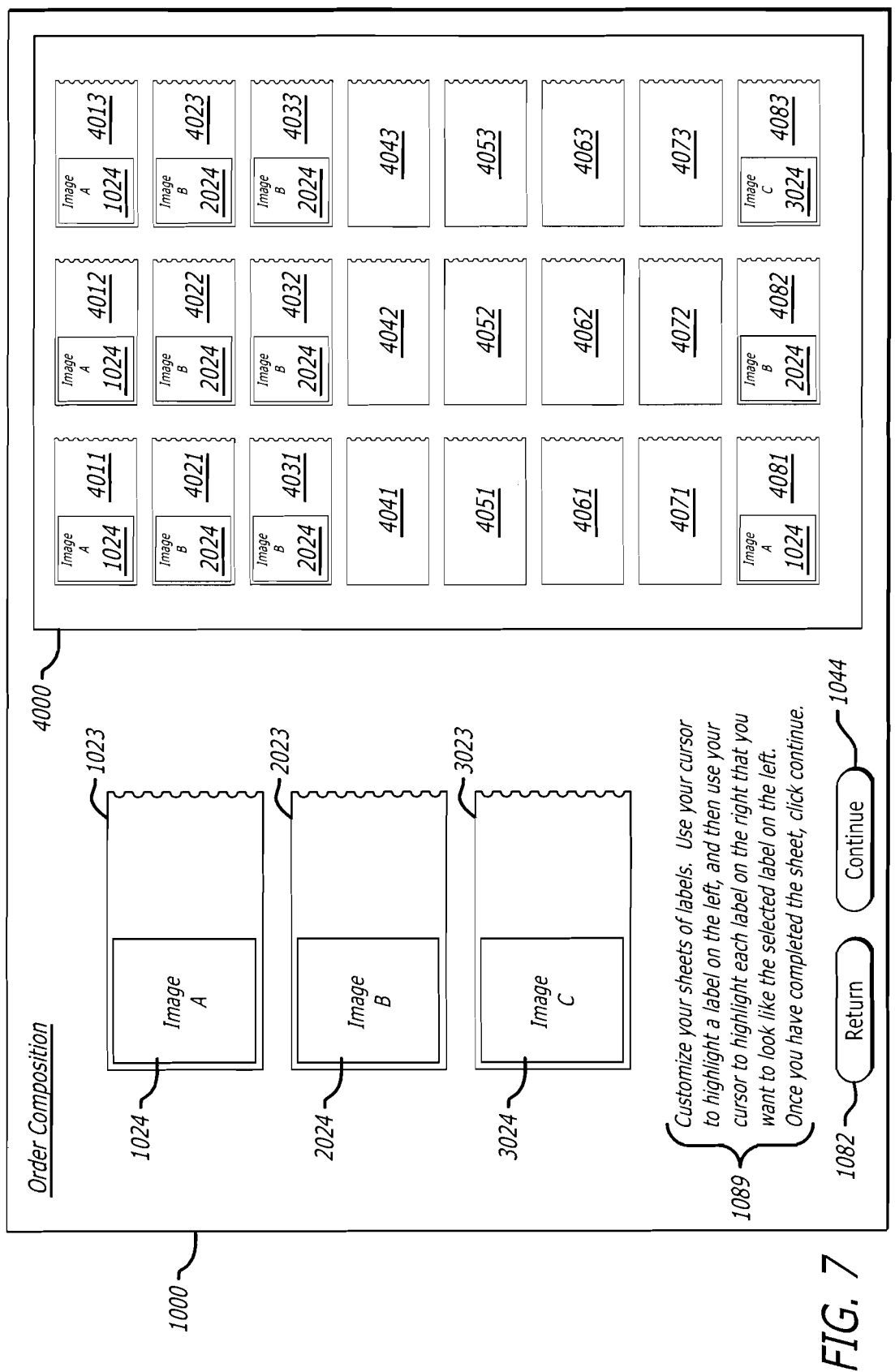
FIG. 7 is a graphic representation depicting a partially composed exemplary sheet in an exemplary user interface Order Completion display in an alternative exemplary multi-image order embodiment of the present invention.

FIG. 7 is a graphic representation depicting a partially composed exemplary sheet 4000, depicting exemplary Image A 1024 in exemplary postage labels 4011-4013 and 4081; exemplary Image B in exemplary postage labels 4021-4023, 4031-4043, an 4082; and exemplary Image C in exemplary postage label 4083.

In the alternative exemplary multi-image order embodiment, if a user clicks the exemplary Continue button 1044 provided on exemplary interactive Order Composition screen display 1000 before completely composing the exemplary display of an exemplary sheet 4000 of exemplary postage labels 4011-4013, 4021-4023, 4031-4033, 4041-4043, 4051-4053, 4061-4063, 4071-4073, and 4081-4083. Initially, exemplary postage labels 4011-4013, 4021-4023, 4031-4033, 4041-4043, 4051-4053, 4061-4063, 4071-4073, and 4081-4083, the alternative exemplary multi-image order embodiment would prevent the user from continuing and would notify the user that the sheet had not yet been completed.

Accordingly, in the alternative exemplary multi-image order embodiment, if the user clicked the exemplary Continue button 1044 for the partially composed exemplary sheet 4000 as depicted in FIG. 7, the alternative exemplary multi-image order embodiment would report to the user that the page had not yet been completed, and would not let the user continue to the next screen.

As mentioned above, in the alternative exemplary multi-image order embodiment, the user interface Exemplary Application screen (element 22 of FIG. 2A) of the user interface Order Specification screen (element 21 of FIG. 2A) would, for example, provide indicators (not shown) for ordering rolls of labels or sheets of labels.

If a user indicated that the user would be ordering rolls of labels, then a single order could be submitted requesting a roll of image-customized postage labels for one image, a second roll of image-customized postage labels for a second image, etc.

Returning with reference to the exemplary embodiment, once an order is submitted, the order will be assigned an order number (sometimes referred to herein as an "Order ID"), the order will be saved on an order database (see, e.g., element 550 on FIG. 8), and the order will be queued for presentation to pre-print Quality Assurance (see function 203 depicted in FIG. 11). In the exemplary embodiment of the present invention, the order will be assigned an order number and the order will be queued for presentation to pre-print Quality Assurance in much the same way as is disclosed in U.S. patent application Entitled: "IMAGE-CUSTOMIZATION OF COMPUTER-BASED VALUE-BEARING ITEMS"; application Ser. No. 10/994,698, filed on Nov. 22, 2004 (the entire contents and disclosure of which has previously been incorporated by reference in full herein for all purposes).

In the exemplary embodiment, an order saved on the order database (see, e.g., element 550 on FIG. 8) comprises, among other things: an identifier of the ordering user; a computer-accessible address of, or other location identifier for, the image originally uploaded by the ordering user; a set of all of the image manipulation (transformation/customization) instructions input by the user to obtain the final image approved by the ordering user as the image to be ordered; payment information; and recipient shipping information. If the user has not indicated a shipping address (see Shipping Address input field 85 in FIG. 5), then the exemplary embodiment will use the address for the user that is stored in a user database created when the user registers (not shown).

In the alternative exemplary multi-image order embodiment, an order queued for presentation to pre-print Quality Assurance may comprise information pertaining to multiple images.

Returning with reference to the exemplary embodiment, the order number assigned will be unique. However, it will be understood by someone with ordinary skill in the art that the order number could be non-unique in alternative embodiments.

In the exemplary embodiment, once an order has been submitted, the order will be assigned a SKU.

Pre-print Quality Assurance will be managed by the exemplary image-customizing postal label computer system of the exemplary embodiment of the present invention in much the same way as disclosed in U.S. patent application Entitled: "IMAGE-CUSTOMIZATION OF COMPUTER-BASED VALUE-BEARING ITEMS"; application Ser. No. 10/994,698, filed on Nov. 22, 2004 (the entire contents and disclosure of which has previously been incorporated by reference in full herein for all purposes). Generally, the exemplary image-customizing postal label computer system will queue the ordered image for review by one or more pre-print Quality Assurance reviewers/users. When the position of an ordered image in the queue is ready for review, the exemplary image-customizing postal label computer system will present the ordered image for review by one or more pre-print Quality Assurance reviewers/users; once the one or more pre-print Quality Assurance reviewers/users have reviewed the ordered image and entered an indication of approval or denial of the image, the exemplary image-customizing postal label computer system will receive the indication from the one or more pre-print Quality Assurance reviewers/users of approval or denial of the ordered image (see function 204 depicted in FIG. 11).

If the ordered image does not pass (see function 205 and the "No" path from function 205 depicted in FIG. 11) pre-print Quality Assurance review, the image will be rejected (see function 206 depicted in FIG. 11). If, on the other hand, the ordered image passes (see function 205 and the "Yes" path from function 205 depicted in FIG. 11) pre-print Quality Assurance review, then the order will be marked on the order database (see, e.g., element 550 on FIG. 8) as passed and ready for further processing; and further functions will be performed to prepare the order for fulfillment.

In the exemplary embodiment of the present invention, the exemplary imago-customizing postal label computer system will produce "socurod paper" image-customized labels. It will be understood by someone with ordinary skill in the art that "secured paper" is paper, or in the case of the exemplary embodiment, label stock, that is secured in some manner from fraudulent printing of value-bearing indicia. One way that labels can be secured from fraudulent printing of value-bearing indicia is to assign each label a unique serial number; subsequent processing of value-bearing indicia would require that the indicia provide, for example, in machine-readable, encrypted form, some indication of, or reference of, the unique serial number. Exemplary systems and methods for producing value-bearing items on secured paper were disclosed, for example, in U.S. patent application Entitled: "IMAGE-CUSTOMIZATION OF COMPUTER-BASED VALUE-BEARING ITEMS"; application Ser. No. 10/994,698, filed on Nov. 22, 2004 (the entire contents and disclosure of which has previously been incorporated by reference in full herein for all purposes).

However, in the aforementioned U.S. patent application Entitled: "IMAGE-CUSTOMIZATION OF COMPUTER-BASED VALUE-BEARING ITEMS", the exemplary value-bearing item indicia comprised not only some indication of, or reference of, a unique serial number, but also comprised an indication of postage, for example, in the form of postage indicia. As compared to labels that comprise an indication of value, such as, for example, an indication of postage, the exemplary image-customized labels produced as secured paper by the exemplary embodiment of the present invention will not comprise any indication of value. That is, the exemplary image-customized labels produced as secured paper by the exemplary embodiment of the present invention will not comprise any indication postage value.

In the exemplary embodiment of the present invention, the exemplary image-customized labels will be produced as secured paper by virtue of the following: 1.) each sheet of labels will bear a human-readable master serial number; 2.) each label will bear a human-readable, unique label serial number that will comprise the master serial number for the sheet of labels on which the label appears plus a two-digit extension; 3.) each label will be specially die-cut to include a serrated, or scalloped, edge, such as, for example, scalloped edge 149 as depicted in FIG. 2B; and 4.) a pattern of invisible fluorescent ink will be positionally applied on the printed surface of each image-customized postage label on the printed sheet.

In the exemplary embodiment, master serial numbers for each sheet, and label serial numbers for each label on the respective sheet, will be generated in much the same way as master serial numbers and label serial numbers are generated as disclosed in U.S. patent application Entitled: "IMAGE-CUSTOMIZATION OF COMPUTER-BASED VALUE-BEARING ITEMS"; application Ser. No. 10/994,698, filed on Nov. 22, 2004 (the entire contents and disclosure of which has previously been incorporated by reference in full herein for all purposes).

In an alternative secured-paper-measure embodiment, additional secured-paper measures would be taken. For example, the pattern of invisible fluorescent ink applied to each label would comprise a machine-readable code indicating a representation of the human-readable label serial number for the respective label. As another example, microprinting would be applied to each label, reflecting, for example, a micro-printed representation of the human-readable label serial number. Further secured-paper measures may include, for example, digital watermarking and/or applying color-changing ink, thermo chromatic ink, opaque ink, ultraviolet ink, phosphorescent ink, invisible ink, fluorescent ink and/or other types of ink, whether now known or in the future discovered that, for example, are not visible to the naked eye but that can be visible if viewed under special lighting and/or with special equipment and/or under special circumstances, and/or that change color when photocopied, and/or that are not visible on photocopies.

In the exemplary embodiment of the present invention, the exemplary image-customizing postal label computer system will format for rendering on printable label stock, "sheets" of image-customized postage labels (see function 207 depicted in FIG. 11). If the user ordered sheets of labels, then sheets of labels, in the number ordered by the user, will be formatted for rendering by a printer.

In the exemplary embodiment of the present invention, with the exception of generating and formatting postage indicia, the exemplary image-customizing postal label computer system will be programmed to generate and format the sheet images in the form of Portable Data Format ("PDF") files in much the same way as disclosed in U.S. patent application Entitled: "IMAGE-CUSTOMIZATION OF COMPUTER-BASED VALUE-BEARING ITEMS"; application Ser. No. 10/994,698, filed on Nov. 22, 2004 (the entire contents and disclosure of which has previously been incorporated by reference in full herein for all purposes; see, e.g., page 49, line 24 through page 60, line 16 discussing, among other things, FIG. 14A of that application).

If the user ordered rolls of labels, then a number of "sheets" of labels will be calculated, sheet identifiers will be assigned, with the exception of postage indicia, the "sheets" of labels will be generated, formatted and rendered by a printer, and rolls of labels will be produced, in much the same way as disclosed in U.S. patent application Entitled: "ROLLS OF IMAGE-CUSTOMIZED VALUE-BEARING ITEMS AND SYSTEMS AND METHODS FOR PROVIDING ROLLS OF IMAGE-CUSTOMIZED VALUE-BEARING ITEMS"; application Ser. No. 11/435,453, filed May 16, 2006, the entire contents and disclosure of which is hereby incorporated by reference in full herein for all purposes.

In the exemplary embodiment of the present invention, once a sheet image has been completely formatted, including all twenty-four (24) image-customized label images, a machine-readable Sheet ID barcode image, and "eye mark" images, the exemplary image-customizing postal label computer system will be programmed to save the sheet image as a file with a particular file name. FIGS. 7 and 12 depict an exemplary Sheet ID barcode 628 and exemplary "eye marks" 621a, 621b, and 621c on an exemplary sheet and on an alternative exemplary sheet respectively.

Figure 8:
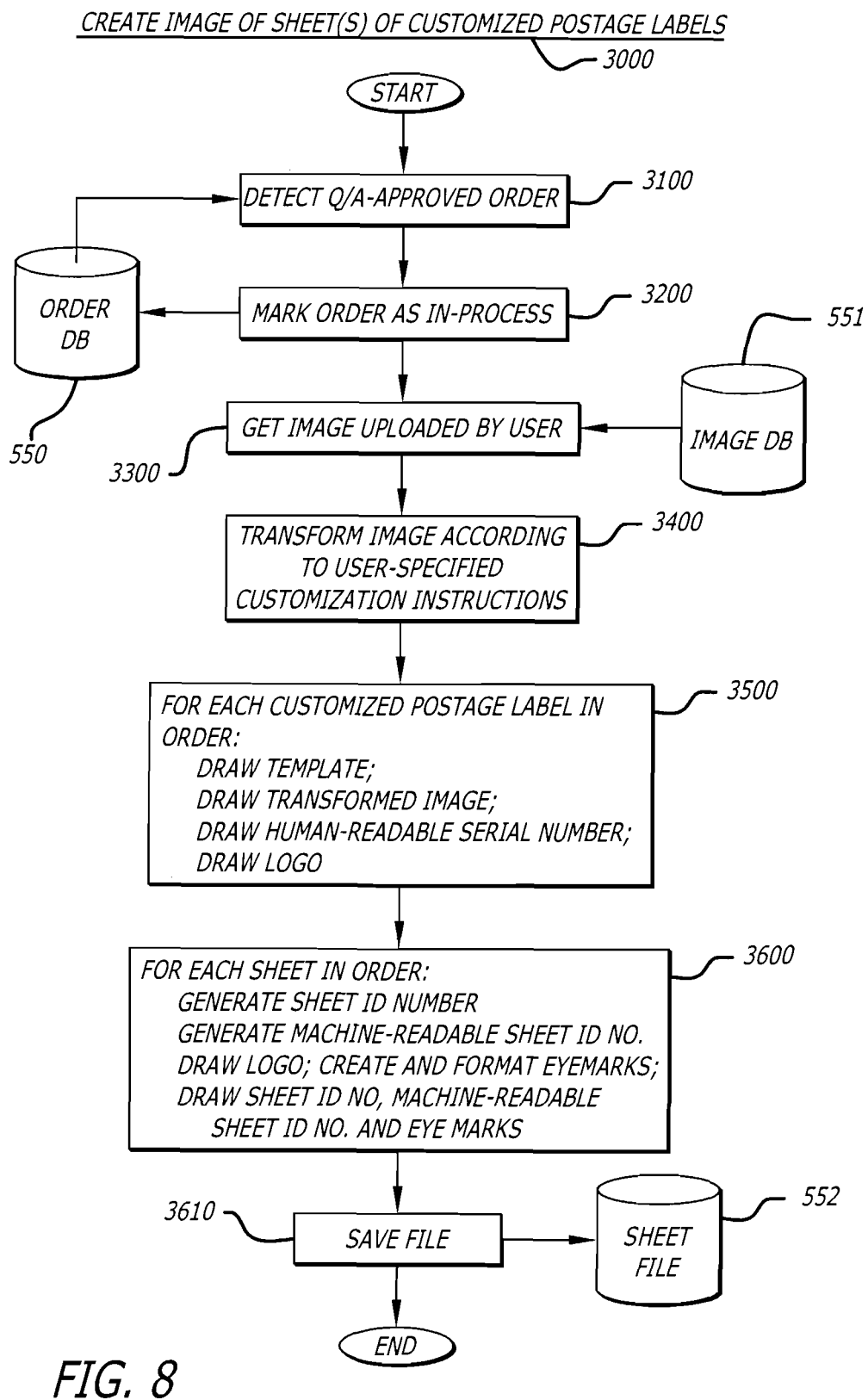
FIG. 8 is a high-level flow diagram depicting exemplary high-level logic functions for creating an image of customized postage labels in the exemplary embodiment of the present invention.

FIG. 8 is a high-level flow diagram depicting exemplary high-level logic functions for creating an image of customized postage labels in the exemplary embodiment of the present invention.

As depicted in FIG. 8, quality-assurance-passed orders on order database 550 will be detected by software, e.g., software executing on an image generation server, as depicted in function 3100. As such quality-assurance-passed orders are detected, a status in the entry for the order, in, e.g., order database 550, will be marked, as denoted in function 3200, to indicate that the order is in-process.

As depicted in FIG. 8, function 3300 of the exemplary embodiment of the present invention will get the original image corresponding to a particular order as that image was uploaded by the corresponding user. Function 3300 will get the original image from the image database 551. If an order includes multiple images, then each image will be retrieved.

In the exemplary embodiment, function 3400 would transform the original image according to the user-specified customization instructions. If an order includes multiple images, then each image will be transformed according to the user-specified customization instructions corresponding to each particular image relating to the particular order.

In the exemplary embodiment, for each customized postage label in the order being processed, function 3500 will perform logic functions to: draw a template for the postage label; draw the transformed image (as resulted from function 3400); draw a human-readable serial number; and draw a logo.

In the exemplary embodiment, for each sheet in the order being processed, function 3600 will generate and assign to each sheet image a Sheet Identifier ("Sheet ID") that identifies the corresponding "sheet". Exemplary Sheet ID's will be generated to comprise elements described further below.

In the exemplary embodiment of the present invention, as depicted in function 3600, once a Sheet ID is assigned to a sheet image, the exemplary image-customizing label computer system will be programmed to format a barcode comprising a machine-readable representation of the Sheet ID; when the machine-readable representation of the Sheet ID is drawn, it will be drawn to incorporate the barcode in an area of a perimeter margin of the corresponding sheet.

Continuing with function 3600, in the exemplary embodiment of the present invention, the exemplary image-customizing label computer system will be programmed to create and format "eye marks"; when the eye marks are drawn, they will be drawn to incorporate the "eye marks" in certain areas of the perimeter margins of the corresponding sheet.

As will be understood by someone with ordinary skill in the art, "eye marks" can be used by certain finishing equipment to, for example, apply surface features to a printed product. In the exemplary embodiment of the present invention, "eye marks" will be formatted and incorporated as part of each exemplary sheet image to guide application by certain finishing equipment in the positional application of invisible fluorescent ink on the printed surface of each image-customized label.

Continuing with function 3600, in the exemplary embodiment of the present invention, once the above-described elements for a sheet image have been generated, the exemplary image-customizing label computer system will be programmed to draw a logo for the sheet, draw the [human-readable] Sheet ID, the machine-readable Sheet ID, and draw the eye marks.

In the exemplary embodiment, customized label features associated with an order would be represented in PDF format. Therefore, in the exemplary embodiment, the drawing in function 3600 would involve drawing multiple PDF-represented features for a particular postage label. For example, each customized postage label would be represented by a PDF-representation of a customized border image (if indicated for the order); a PDF-representation of the customized image uploaded by the user; and the like. In the exemplary embodiment, in function 3500, a PDF-formatted representation of each image for which a customized label has been ordered will be drawn in PDF format; in function 3600, for each sheet in the order, an image of a sheet of labels will be drawn in PDF format.

In the exemplary embodiment of the present invention, the Sheet ID's and sheet image file names will comprise: A.) a file group ID of "2000"; B.) a day counter that will be incremented for each day; C.) a sheet number in the day that will be initialized to one for each file group ID and day counter combination and be incremented for each sheet produced for the file group; D.) a sheet number in the order, which will be a specific sheet number in the customer order; and E.) a total sheets in the order, which will remain fixed on each sheet in the order. In the exemplary embodiment, the sheet number in the order, and the total sheets in the order will not be incorporated in the machine-readable representation of the Sheet ID.

With reference to function 3610, once a sheet image has been completely formatted, including all twenty-four (24) (or in the case of an order for one or more rolls of image-customized labels, thirty-two (32)) image-customized label images, a logo, a human-readable Sheet ID, a machine-readable Sheet ID barcode image, and "eye mark" images, the exemplary image-customizing label computer system will be programmed to assemble the sheet image as part of a sheet image file. Once all of the sheet images in an order have been assembled in a filed, the file is save on a sheet file 552 with a particular File Identifier (Ale ID) as described further below.

In the exemplary embodiment of the present invention, File ID's will comprise: A.) a file group ID, which in the exemplary embodiment, may comprise the number "2000" for regular orders, "2010" for expedited orders, or "2020" for rush orders; B.) a day counter, which will be incremented each day; and C.) a file number for the group and day, which will be initialized to one at the beginning of a day and will be incremented for each file for the day.

In the exemplary embodiment of the present invention, the exemplary image-customizing label computer system will be programmed to periodically save a batch of saved sheet image files onto an encrypted hard drive for printing.

In the exemplary embodiment of the present invention, the exemplary image-customizing postal label computer system will be programmed to count the total number of sheets/files in a batch and ensure that all of the sheets/files in the batch are present and in sequential order. Missing sheets would be reported.

In the exemplary embodiment of the present invention, the exemplary image-customizing label computer system will populate and print a shipping manifest for shipment with a fulfilled order of image-customized postage labels.

In the exemplary embodiment of the present invention, each batched file will then be converted to a format that can be used by a print-rendering device (such as a printer); the resulting converted file will be provided to a print-rendering device. In the exemplary embodiment of the present invention, a high-speed label printer, such as, for example, an HP® Indigo press ws4050 (produced by Hewlett-Packard Company of 20 Perimeter Summit Blvd., Atlanta, Ga.) will be used as an exemplary device for rendering image-customized postage labels onto the exemplary thirteen inch (13") wide pressure sensitive, liner-backed, self-adhesive label stock (see function 209 depicted in FIG. 11).

It will be understood by someone with ordinary skill in the art that description of use in the exemplary embodiment of a roll of exemplary thirteen inch (13") wide pressure sensitive, liner-backed, self-adhesive label stock is not a limitation of the present invention. Rather, sheets of pressure sensitive, liner-backed, self-adhesive label stock could be used in an alternative embodiment. Further, alternative print-rendering devices could be used that would operate with rolls of a different width.

In the exemplary embodiment of the present invention, the pressure sensitive, liner-backed, self-adhesive label stock that will be used will meet both USPS postage label specifications and will meet requirements for high-speed postage applicator devices, such as high-speed postage applicator devices made by, e.g., VERTIS MANUFACTURING. For example, in the exemplary embodiment, the exemplary default label stock will be fifty-four pound (54#) white semi-gloss label stock; the default label stock will have a permanent adhesive that meets USPS postage label specifications that require that the label, once applied, cannot be removed from the medium to which it has been applied after forty-eight (48) hours of the label having been applied without tearing either the label or the medium. For example, in the exemplary embodiment, the default label stock will have a permanent acrylic emulsion adhesive. In the exemplary embodiment, the default label stock will have a forty pound (40#) "SCK" liner backing. In the exemplary embodiment, image-customized postage labels will be printed using a four-color (polychromatic) ink process of at loast 300 by 300 dots per inch (300×300 dpi).

In the exemplary embodiment of the present invention, the print-rendering device will render each sheet image file on to a respective sheet portion of a roll of liner-backed adhesive label stock. Once the sheet images for an order have been printed, the Sheet ID barcode on each sheet will be scanned (see function 209 depicted in FIG. 11). An exemplary print manifest computer program will be executed that will check all of the scanned Sheet ID's for an order to ensure that all of the sheets in an order have been printed, that no duplicate sheets have been printed, and that all of the sheets are in sequential order. The exemplary print manifest computer program will report missing sheets, duplicate sheets and out of order sheets for manual resolution.

In the exemplary embodiment of the present invention, the printed label stock for all Sheets in an order will then be fed through a special piece of equipment that applies a pattern of fluorescent ink (see function 209 depicted in FIG. 11) to each image-customized postage label on each Sheet in the order and that kiss-cuts a border around each image-customized postage label on each Sheet in the order. In the exemplary embodiment of the present invention, a device such as an OMEGA DIGICON™ S (provided by ABG International) will be used to apply the fluorescent ink pattern and kiss-cut the labels.

In the exemplary embodiment of the present invention, a device such as an OMEGA DIGICON™ S (provided by ABG International) will be used to apply clear (sometimes referred to as "invisible") fluorescent ink to each printed postage label on each "sheet" of image-customized postage labels in an order. A particular pattern of (clear/invisible) fluorescent ink will be applied in order to facilitate cancellation by the postal service. In the exemplary embodiment of the present invention, the fluorescent ink will meet USPS requirements for a target 620 nm wave length luminescence and red indicator; and will have luminescence levels less than twenty-three (23) PMU on a red fluorescent sensor. The clear (invisible) fluorescent pattern will be applied in the exemplary embodiment of the present invention in a manner so that the clear fluorescent pattern can be detected by a USPS AFCS (Automated Facing Cancellation System) during facing and sorting operations by the USPS.

It will be understood by someone with ordinary skill in the art that application of a pattern of fluorescent ink to each exemplary image-customized postage label is not a limitation of the invention. Other means, whether now known or in the future discovered, could be used to facilitate USPS automated facing and cancellation without departing from the spirit of the present invention.

In the exemplary embodiment, the "eye marks" on each sheet of the order will be used by the device applying the fluorescent ink (such as an OMEGA DIGICON™ S (provided by ABG International)), to determine with precision the location on each sheet for application of the fluorescent ink.

Figure 9:
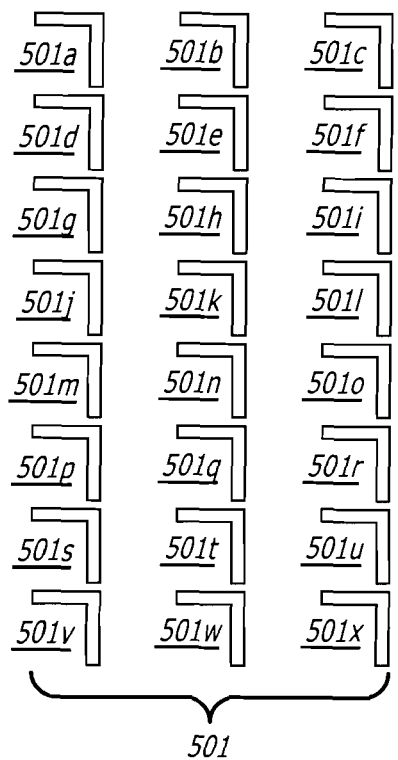
FIG. 9 is a graphic representation depicting an exemplary pattern of fluorescent ink for application to printed sheets of image-customized postage labels in the exemplary embodiment of the present invention.

FIG. 9 is a graphic representation depicting an exemplary pattern 501 of fluorescent ink for application to printed sheets of image-customized postage labels in the exemplary embodiment of the present invention. As depicted in FIG. 9, in the exemplary embodiment of the present invention, the pattern 501 of fluorescent ink will comprise a plurality of fluorescent ink patterns 501a through 501x. In the exemplary embodiment of the present invention, the pattern 501 of fluorescent ink would be applied on a "sheet" of printed image-customized labels so that each fluorescent ink pattern 501a through 501x would be applied to each of the image-customized labels on the sheet.

It will be understood by someone with ordinary skill in the art that the individual fluorescent ink patterns 501a through 501x depicted in FIG. 9, once applied, will surround, and will not overlay or interfere with, postage indicia that would eventually be applied to the labels or with the brand logo 147, or serial number 125 as depicted in FIG. 2B on each image-customized label on the sheet; the individual fluorescent ink patterns 501a through 501x depicted in FIG. 9, once applied, will not overlay or interfere with any portion of the customized image 124 or border 148 as depicted in FIG. 2B on each image-customized label on the sheet.

Figure 10:
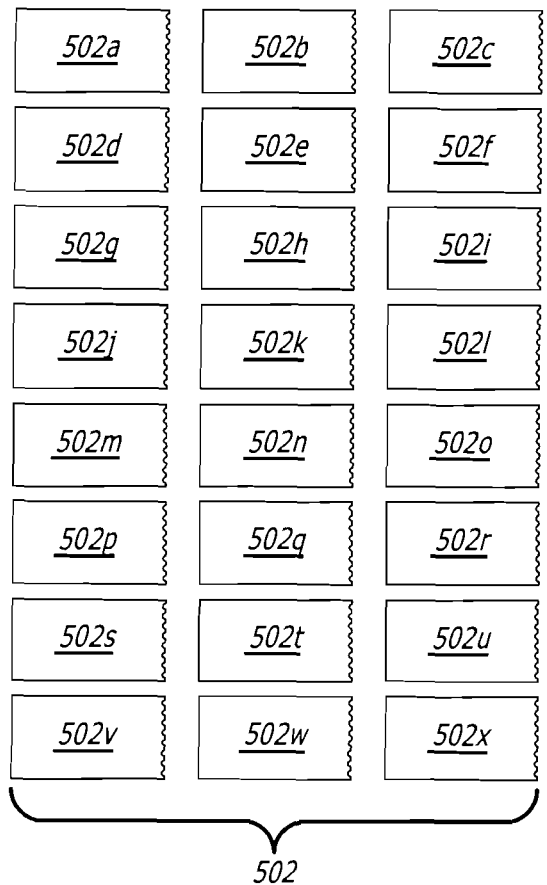
FIG. 10 is a graphic representation depicting an exemplary pattern of a die-cut pattern for application to printed sheets of image-customized labels in the exemplary embodiment of the present invention.

In the exemplary embodiment of the present invention, a device such as an OMEGA DIGICON™ S (provided by ABG International) will be used to kiss-cut (die-cut) (see function 209 depicted in FIG. 11) a border around each image-customized postage label on each "Sheet" in the order so that the kiss-cut will pierce the adhesive-backed label but will not pierce the label liner. FIG. 10 is a graphic representation depicting an exemplary pattern 502 of a die-cut pattern for application to printed sheets of image-customized labels in the exemplary embodiment of the present invention. It will be understood by someone with ordinary skill in the art that the description of the exemplary embodiment of kiss-cutting the liner-backed, self-adhesive label stock so that the kiss-cut will pierce the adhesive-backed label but will not pierce the label liner is not a limitation of the invention.

In the exemplary embodiment, the image-customized postage label will be kiss-cut so that at least one-thirty-second of an inch (1/32") of clear space will surround the printed image of the entire image-customized postage label on all sides. That is, there will be at least one-thirty-second of an inch (1/32") of clear space between the printed image of the entire image-customized postage label and the kiss-cut on all sides.

After die-cutting the labels, the sheets would be trimmed, removing, among other things, the "eye marks" and Sheet ID barcode (see function 209 depicted in FIG. 11).

If instead of sheets of labels, rolls of labels were ordered, the "sheets" of labels (comprising thirty-two (32), rather than twenty-four (24) labels) would be sliced in much the same way as disclosed in U.S. patent application Entitled: "ROLLS OF IMAGE-CUSTOMIZED VALUE-BEARING ITEMS AND SYSTEMS AND METHODS FOR PROVID-ING ROLLS OF IMAGE-CUSTOMIZED VALUE-BEARING ITEMS"; application Ser. No. 11/435,453, filed May 16, 2006, the entire contents and disclosure of which was previously incorporated by reference in full herein for all purposes.

Finalized sheets of image-customized labels in an order will be assembled and shipped to either the ordering user, or depending on shipping instructions provided by the user as part of the order, to a party designated by the user (the "designated recipient user").

Once the designated recipient user has received the image-customized labels, the designated recipient user would then access an authorized computer-based, generic, postage provider website (e.g., element 19, FIG. 1), such as, for example, www.stamps.com. The designated recipient user would access the authorized computer-based, generic, postage provider website via a client computer device, e.g., client computer device 10a as depicted in FIG. 1.

Accessing the authorized computer-based, generic, postage provider website (e.g., element 19, FIG. 1), the designated recipient user would then choose to order computer-based, generic postage, such as is provided under the name of "NETSTAMPS™" at www.stamps.com, or as disclosed, for example, in U.S. patent application Ser. No. 09/975,532 entitled "SYSTEM AND METHOD FOR PROVIDING COMPUTER-BASED POSTAGE STAMPS", the contents and disclosures of which have previously been incorporated by reference in full herein for all purposes as if fully stated here.

In summary, at the authorized computer-based, generic, postage provider website e.g., element 19, FIG. 1), the designated recipient user would select an option for ordering computer-based, generic postage, such as is provided under the name of "NETSTAMPS™" at www.stamps.com. At the authorized computer-based, generic, postage provider website, the designated recipient user would input in an input field provided by a graphic user interface displayed by the authorized computer-based, generic, postage provider website (e.g., element 19, FIG. 1) (or alternatively, by client software enabled to communicate with the authorized computer-based, generic, postage provider website), the master serial number for a particular sheet of image-customized labels. The designated recipient user would also input a postage amount to be printed. Using features provided by the authorized computer-based, generic, postage provider website, the designated recipient user would also designate one or more of the image-customized labels for printing the designated amount of postage.

The authorized computer-based, generic, postage provider website (e.g., element 19, FIG. 1) (or alternatively, by client software enabled to communicate with the authorized computer-based, generic, postage provider website) would validate the designated recipient user as an authorized user. The authorized computer-based, generic, postage provider website (e.g., element 19, FIG. 1) (or alternatively, by client software enabled to communicate with the authorized computer-based, generic, postage provider website) would also validate the master serial number input by the designated recipient user. For authorized users, and for valid master serial numbers, the authorized computer-based, generic, postage provider website (e.g., element 19, FIG. 1) (or alternatively, by client software enabled to communicate with the authorized computer-based, generic, postage provider website) would generate postage indicia in a manner, and with the accounting and safeguards, such as described in U.S. patent application Ser. No. 09/975,532 entitled "SYSTEM AND METHOD FOR PROVIDING COMPUTER- BASED POSTAGE STAMPS", the contents and disclosures of which have previously been incorporated by reference in full herein for all purposes as if fully stated here.

With reference to FIG. 1, once the postage indicia has been generated, the authorized computer-based, generic, postage provider website 19 (or alternatively, by client software enabled to communicate with the authorized computer-based, generic, postage provider website) would cause the printing of the postage indicia on a print rendering device in communication with the designated recipient user's client computer device 10a, such as, for example, printer 16a.

Other features of the invention are implicit in the above-provided description and/or are depicted and/or implicit in the accompanying Figures.

Facsimile Reproduction of Copyright Material

A portion of the disclosure of this patent document contains material which is subject to copyright protection by the copyright owner, Stamps.com Inc., its successors and assigns. The copyright owner has no objection to the facsimile reproduction by anyone of the patent document or the patent disclosure, as it appears in the Patent and Trademark Office patent file or records, but otherwise reserves all copyright rights whatsoever.

Illustrative Embodiments

Although this invention has been described in certain specific embodiments, many additional modifications and variations would be apparent to those skilled in the art. It is, therefore, to be understood that this invention may be practiced otherwise than as specifically described. Moreover, to those skilled in the various arts, the invention itself herein will suggest solutions to other tasks and adaptations for other applications. Thus, the embodiments of the invention described herein should be considered in all respects as illustrative and not restrictive, the scope of the invention to be determined by the appended claims and their equivalents rather than the foregoing description.

The invention claimed is:

1. A system for facilitating customer-side printing of postage indicia on provider-printed customer-customized labels, the system comprising:
    a computer system comprising one or more physical processors programmed to execute computer program instructions that, when executed, cause the computer system to:
        obtain, via the Internet, a first user request for a physical print of a non-value-bearing label customized with a user-provided image;
        assign an identification code to the non-value-bearing label, at least a portion of the identification code being usable to modify the non-value-bearing label into a value-bearing label;
        print and die-cut, based on the user-provided image and the identification code, a self-adhesive label sheet comprising multiple non-value-bearing labels such that the identification code is represented as an invisible fluorescent ink pattern on the non-value-bearing label of the self-adhesive label sheet, wherein the non-value-bearing label and other labels of the multiple non-value-bearing labels do not specify a postage value;
        subsequent to delivery of the self-adhesive label sheet to a customer, obtain, from a client device via the Internet, a second user request for postage indicia having a user-selected postage value to be printed on the non-value-bearing label of the self-adhesive label sheet, the second user request comprising the identification code portion; and
        cause, based on system validation of the identification code portion in the second user request, printing of the postage indicia to be enabled for the client device to create a value-bearing label, the printed value-bearing label (i) being created from the non-value-bearing label of the self-adhesive label sheet and (ii) comprising the user-provided image, the identification code, and the postage indicia.

2. The system of claim 1, wherein the system validation of the identification code portion is a system validation of the identification code such that all portions of the identification code are used to validate the second user request.

3. The system of claim 1, wherein the computer system is caused to:
    obtain, based on a scan of the printed value-bearing label, a validation request to validate the printed value-bearing label, the validation request comprising the identification code and data of the postage indicia; and
    validate the printed value-bearing label responsive to a determination that the identification code corresponds to the postage indicia, the postage indicia being associated with a digital signature.

4. The system of claim 1, wherein the computer system is caused to:
    provide a user interface on which first and second portions of the user interface are presented in-view on the user interface at a given time, the first user interface portion presenting a first set of selectable labels customized with respective user-provided images, the second user interface portion presenting a second set of selectable labels on a sheet;
    obtain, via the user interface, a user selection of a label from the first set of selectable labels that is to be applied to at least one label of the second set of selectable labels; and
    obtain, via the user interface, a user selection of multiple labels of the second set of selectable labels subsequent to the user selection of the first-set label; and
    cause, via the user interface, based on the user selection of the first-set label and the multiple second-set labels, the first-set label to be applied to the multiple second-set labels without requiring further user selection of the first-set label to apply the first-set label to the multiple second-set labels,
    wherein the first user request for a physical print of the non-value-bearing label is based on the first-set label being applied to the multiple second-set labels, the non-value-bearing label being a version of the first-set label.

5. The system of claim 4, wherein the computer system is caused to:
    obtain, via the user interface, a user selection of another label from the first set of selectable labels that is to be applied to at least one label of the second set of selectable labels;
    obtain, via the user interface, a user selection of another label of the second set of selectable labels subsequent to the user selection of the other first-set label, the other second-set label being a label on the sheet in addition to the multiple second-set labels; and
    cause, via the user interface, based on the user selection of the other first-set label and the other second-set label, the other first-set label to be applied to the other second-set label.

6. The system of claim 1, wherein the first user request is a request for a physical print of a sheet of non-value-bearing labels, the sheet of non-value bearing labels comprising the non-value-bearing label and other non-value bearing labels, and wherein the computer system is caused to:
assign a master identification code to the sheet of non-value-bearing labels, the master identification code being the identification code portion such that the identification code assigned to the non-value-bearing label comprises the master identification code and one or more characters in addition to the master identification code; and
assign another identification code to each of the other non-value bearing labels such that each of the other identification codes assigned to the other non-value bearing labels are different from one another.

7. The system of claim 6, wherein the computer system is caused to:
cause, via the printing device, printing of the sheet of non-value-bearing labels such that the printed sheet of non-value bearing labels comprises the user-provided image, the master identification code, the identification code, and the other identification codes without an indication of a postage value on the sheet of non-value bearing labels.

8. The system of claim 1, wherein the computer system is caused to:
assign, based on the system validation of the identification code portion in the second user request, the user-selected postage value to the identification code.

9. The system of claim 1, wherein the computer system is caused to:
obtain the user-provided image based on a user input provided via a user interface; and
obtain quality assurance review information indicating that the user-provided image has passed quality assurance review,
wherein the printing of the non-value-bearing label is caused further based on the quality assurance review information.

10. The system of claim 1, wherein the self-adhesive label sheet is printed at a provider site, and wherein the first user request and the second user request originated from a customer of the provider.

11. The system of claim 1, wherein the self-adhesive label sheet is printed at a non-customer entity site, and wherein the first user request and the second user request originated from a customer of a provider associated with the non-customer entity.

12. A method of facilitating customer-side printing of postage indicia on provider-printed customer-customized labels, the method being implemented by a computer system comprising one or more physical processors executing computer program instructions that, when executed, perform the method, the method comprising:
obtaining, via the Internet, a first user request for a physical print of a non-value-bearing label customized with a user-provided image;
assigning an identification code to the non-value-bearing label, at least a portion of the identification code being usable to modify the non-value-bearing label into a value-bearing label;
printing and die-cutting, based on the user-provided image and the identification code, a self-adhesive label sheet comprising multiple non-value-bearing labels such that the identification code is represented as an invisible fluorescent ink pattern on the non-value-bearing label of the self-adhesive label sheet, wherein the non-value-bearing label and other labels of the multiple non-value-bearing labels do not specify a postage value;
subsequent to delivery of the self-adhesive label sheet to a customer, obtaining, from a client device via the Internet, a second user request for postage indicia having a user-selected postage value to be printed on the non-value-bearing label of the self-adhesive label sheet, the second user request comprising the identification code portion; and
causing, based on system validation of the identification code portion in the second user request, printing of the postage indicia to be enabled for the client device to create a printed value-bearing label, the printed value-bearing label (i) being created from the non-value-bearing label of the self-adhesive label sheet and (ii) comprising the user-provided image, the identification code, and the postage indicia.

13. The method of claim 12, further comprising:
obtaining, based on a scan of the printed value-bearing label, a validation request to validate the printed value-bearing label, the validation request comprising the identification code and data of the postage indicia; and
validating the printed value-bearing label responsive to a determination that the identification code corresponds to the postage indicia, the postage indicia being associated with a digital signature.

14. The method of claim 12, further comprising:
providing a user interface on which first and second portions of the user interface are presented in-view on the user interface at a given time, the first user interface portion presenting a first set of selectable labels customized with respective user-provided images, the second user interface portion presenting a second set of selectable labels on a sheet;
obtaining, via the user interface, a user selection of a label from the first set of selectable labels that is to be applied to at least one label of the second set of selectable labels; and
obtaining, via the user interface, a user selection of multiple labels of the second set of selectable labels subsequent to the user selection of the first-set label; and
causing, via the user interface, based on the user selection of the first-set label and the multiple second-set labels, the first-set label to be applied to the multiple second-set labels without requiring further user selection of the first-set label to apply the first-set label to the multiple second-set labels,
wherein the first user request for a physical print of the non-value-bearing label is based on the first-set label being applied to the multiple second-set labels, the non-value-bearing label being a version of the first-set label.

15. The method of claim 14, further comprising:
obtaining, via the user interface, a user selection of another label from the first set of selectable labels that is to be applied to at least one label of the second set of selectable labels;
obtaining, via the user interface, a user selection of another label of the second set of selectable labels subsequent to the user selection of the other first-set label, the other second-set label being a label on the sheet in addition to the multiple second-set labels; and causing, via the user interface, based on the user selection of the other first-set label and the other second-set label, the other first-set label to be applied to the other second-set label.

16. The method of claim 12, wherein the first user request is a request for a physical print of a sheet of non-value-bearing labels, the sheet of non-value bearing labels comprising the non-value-bearing label and other non-value bearing labels, the method further comprising:

assigning a master identification code to the sheet of non-value-bearing labels, the master identification code being the identification code portion such that the identification code assigned to the non-value-bearing label comprises the master identification code and one or more characters in addition to the master identification code; and assigning another identification code to each of the other non-value bearing labels such that each of the other identification codes assigned to the other non-value bearing labels are different from one another.

17. The method of claim 16, further comprising:

causing, via the printing device, printing of the sheet of non-value-bearing labels such that the printed sheet of non-value bearing labels comprises the user-provided image, the master identification code, the identification code, and the other identification codes without an indication of a postage value on the sheet of non-value bearing labels.

18. The method of claim 12, wherein the self-adhesive label sheet is printed at a provider site, and wherein the first user request and the second user request originated from a customer of the provider.

\* \* \* \* \*